United States Patent
Leisenheimer et al.

(10) Patent No.: US 11,824,478 B2
(45) Date of Patent: Nov. 21, 2023

(54) TWO OUTPUT PIN PROTOCOL FOR SPEED, DIRECTION, AND DIAGNOSIS

(71) Applicant: Infineon Technologies AG, Neubiberg (DE)

(72) Inventors: Stephan Leisenheimer, Deisenhofen (DE); Konrad Kapser, Graefelfing (DE); Rainer Kling, Munich (DE); Sebastian Maerz, Neubiberg (DE); Romain Peron, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 562 days.

(21) Appl. No.: 16/923,499

(22) Filed: Jul. 8, 2020

(65) Prior Publication Data
US 2022/0014131 A1 Jan. 13, 2022

(51) Int. Cl.
| | | |
|---|---|---|
| H02P 9/00 | (2006.01) | |
| G01P 13/04 | (2006.01) | |
| G01P 21/00 | (2006.01) | |
| G01P 3/487 | (2006.01) | |
| G07C 5/02 | (2006.01) | |

(52) U.S. Cl.
CPC ............ *H02P 9/006* (2013.01); *G01P 3/487* (2013.01); *G01P 13/045* (2013.01); *G01P 21/00* (2013.01); *G07C 5/02* (2013.01)

(58) Field of Classification Search
CPC ......... G01P 3/487; G01P 13/045; G01P 21/00
See application file for complete search history.

(56) References Cited

U.S. PATENT DOCUMENTS

| | | | |
|---|---|---|---|
| 5,497,082 A | 3/1996 | Hancock | |
| 9,944,218 B1* | 4/2018 | Park | H05B 47/28 |
| 2008/0180089 A1 | 7/2008 | Stolfus et al. | |
| 2013/0113400 A1* | 5/2013 | Kishimoto | H02P 6/16 |
| | | | 318/400.14 |
| 2018/0136999 A1* | 5/2018 | Fernandez | G06F 11/0772 |
| 2020/0025837 A1 | 1/2020 | Rubinsztain et al. | |
| 2020/0358432 A1* | 11/2020 | Wysocki | H04L 7/033 |

FOREIGN PATENT DOCUMENTS

| | | |
|---|---|---|
| DE | 102015110225 A1 | 1/2016 |
| DE | 102017219448 A1 | 5/2018 |
| DE | 102018120710 A1 | 3/2019 |

* cited by examiner

*Primary Examiner* — Alesa Allgood
*Assistant Examiner* — Sangkyung Lee
(74) *Attorney, Agent, or Firm* — Harrity & Harrity, LLP

(57) ABSTRACT

A sensor device includes a first sensor element that generates a first sensor signal based on a varying magnetic field; a second sensor element that generates a second sensor signal based on the varying magnetic field; a signal processing circuit configured to generate a first pulsed signal based on the first sensor signal and generate a second pulsed signal based on the second sensor signal; a fault detector that detects a fault and generates an error signal indicating the fault; and an output generator that receives the error signal based on a first condition that the fault detector detects the fault, and simultaneously outputs a first output signal and a second output signal. In response to the first condition being satisfied, the output generator maintains the first output signal in a steady state and outputs the second pulsed signal as the second output signal.

29 Claims, 15 Drawing Sheets

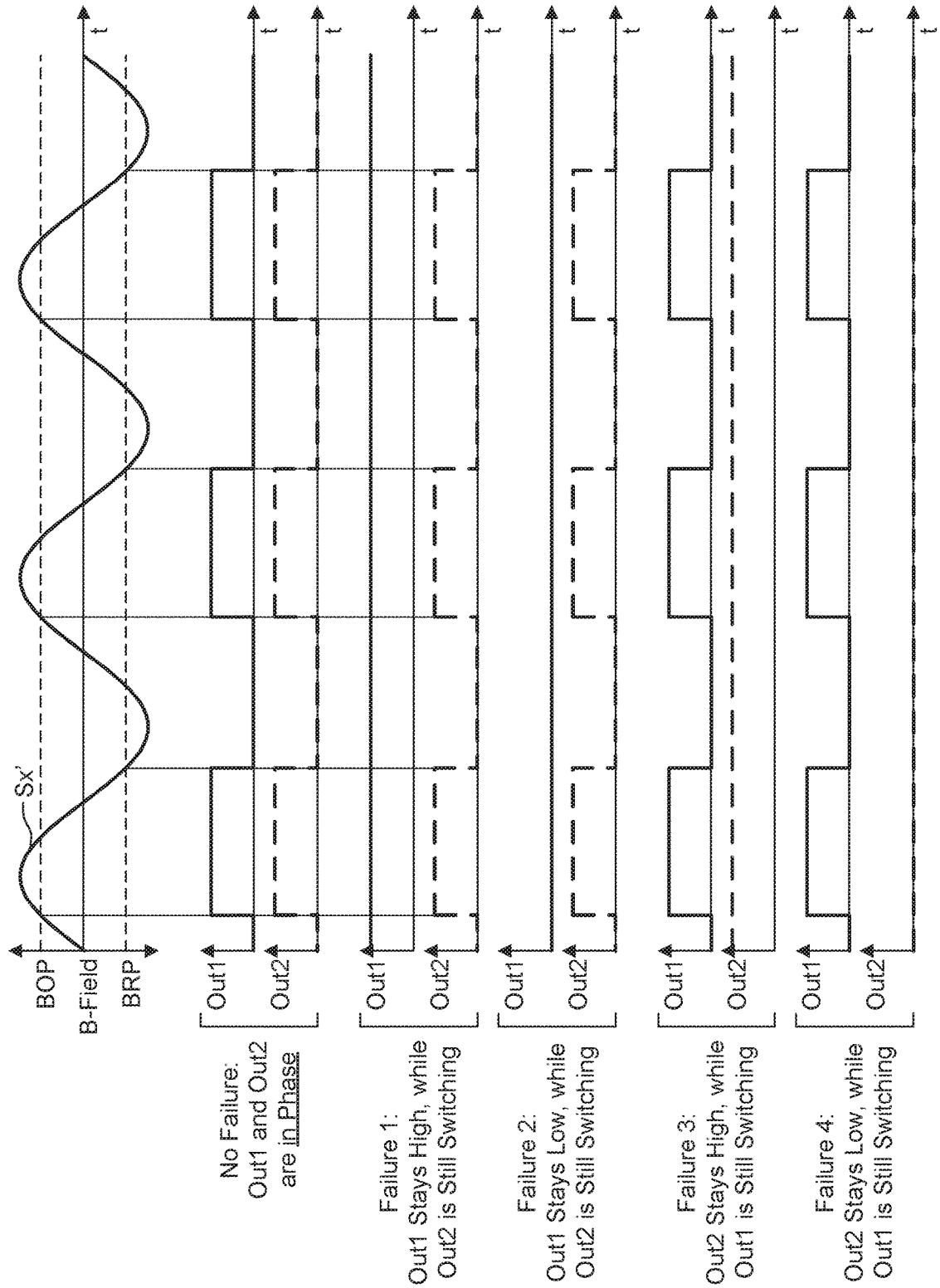

TWO OUTPUT PIN PROTOCOL FOR SPEED, DIRECTION, AND DIAGNOSIS

BACKGROUND

Magnetic speed sensors are used in speed sensing for many applications in many industries including in the automotive industry for wheel speed, engine speed, and transmission speed, and the like. In the field of speed sensing, a sinusoidal signal may be generated by a magnetic sensor in response to a rotation of a target object, such as a wheel, camshaft, crankshaft, or the like. The sinusoidal signal may be translated into pulses, which is further translated into a movement detection or a speed output.

One purpose of an engine speed sensor or a crankshaft sensor is to assess the speed at which the crankshaft spins. That is, it measures the speed and the direction of the crankshaft rotation. These speed sensors are electronic control devices which are used in automotive internal combustion engines. This component sends crucial information to an Electronic Control Unit (ECU) (e.g., an engine control module (ECM)). The information from a crankshaft speed sensor is used to control the engine management, fuel injection, and ignition timing systems.

Information from a speed sensor may generate a speed signal representative of the speed of a target object as well as a direction signal representative of the rotational direction of the movement of the target object. Thus, a speed sensor may include a first output pin for outputting a speed signal and a second output pin for outputting a direction signal.

In addition, the speed sensor may be configured to provide diagnostic information to a microcontroller, such as the ECU. Conventional speed sensors use a third output pin to output this diagnostic information. However, implementing a third pin comes along with additional costs of the device and the overall system.

For example, a so called "life tick" may be generated and output by a third output pin. Such a life tick is difficult to implement, because it must be clarified, what happens, when a life tick occurs together with a signal change. Also, a timing must be defined. This also means that the fault reaction time is defined in this way on system level, which makes the implementation in safety critical applications less flexible. Also, the microcontroller has to measure all the timings.

Therefore, an improved speed sensor capable of providing speed, direction, and diagnosis information, or providing speed and two diagnosis information, with a maximum usage of two output pins may be desirable.

SUMMARY

Embodiments are directed to a speed sensor capable of providing speed, direction, and diagnosis information with a maximum usage of two output pins.

One or more embodiments is directed to a sensor device that includes at least one first sensor element having a first sensing direction and configured to generate at least one first sensor signal based on sensing a first magnetic field component of a varying magnetic field aligned in the first sensing direction; at least one second sensor element having a second sensing direction and configured to generate at least one second sensor signal based on sensing a second magnetic field component of the varying magnetic field aligned in the second sensing direction; a signal processing circuit configured to generate a first pulsed signal based on the at least one first sensor signal and generate a second pulsed signal based on the at least one second sensor signal; a fault detector configured to detect at least one fault and generate an error signal indicating the at least one fault in response to detecting the at least one fault; and an output generator configured to receive the first pulsed signal and the second pulsed signal, receive the error signal based on a first condition that the fault detector detects the at least one fault, and simultaneously output a first output signal and a second output signal. Based on a second condition that the fault detector does not detect the at least one fault, the output generator is configured to output the first pulsed signal as the first output signal and output the second pulsed signal as the second output signal. In response to the first condition being satisfied, the output generator is configured to maintain the first output signal in a steady state and output the second pulsed signal as the second output signal.

One or more embodiments is directed to a sensor system that includes a sensor device and a microcontroller. The sensor device includes at least one first sensor element configured to generate at least one first sensor signal based on sensing a first magnetic field component of a varying magnetic field; at least one second sensor element configured to generate at least one second sensor signal based on sensing a second magnetic field component of the varying magnetic field aligned; a signal processing circuit configured to generate a first pulsed signal based on the at least one first sensor signal and generate a second pulsed signal based on the at least one second sensor signal; a fault detector configured to detect at least one fault and generate an error signal indicating the at least one fault in response to detecting the at least one fault; and an output generator configured to receive the first pulsed signal and the second pulsed signal, receive the error signal based on a first condition that the fault detector detects the at least one fault, and simultaneously output a first output signal and a second output signal. Based on a second condition that the fault detector does not detect the at least one fault, the output generator is configured to output the first pulsed signal as the first output signal. In response to the first condition being satisfied, the output generator is configured to maintain the first output signal in a steady state and output the second pulsed signal as the second output signal. The microcontroller is coupled to the sensor device and is configured to receive the first output signal and the second output signal, and detect the at least one fault based on the first output signal and the second output signal.

One or more embodiments is directed to a microcontroller, including: a first input pin configured to receive a first signal; a second input pin configured to receive a second signal, wherein the first signal and the second signal are received simultaneously and together indicate either a normal condition, a first fault condition, or a second fault condition; and at least one processor configured to evaluate the first signal and the second signal, and detect the normal condition, the first fault condition, or the second fault condition based on the evaluated first signal and the evaluated second signal. The at least one processor is configured to detect transition edges of the first signal and the second signal, and, at each detected transition edge of the first output signal and the second output signal, determine whether two synchronous edges are detected, the two synchronous edges include a first transition edge of the first signal being synchronous with a second transition edge of the second signal. On a condition that the two synchronous edges are detected, the at least one processor is configured to determine that the normal condition is present, and, on a condition that the two synchronous edges are not detected, the at least one processor is configured to detect that one of the first fault condition or the second fault condition occurred.

One or more embodiments is directed to a microcontroller, including: a first input pin configured to receive a first signal; a second input pin configured to receive a second signal, wherein the first signal and the second signal are received simultaneously and together indicate either a normal condition or a fault condition; and at least one processor configured to evaluate the first signal and the second signal, and detect the normal condition or the fault condition based on the evaluated first signal and the evaluated second signal. The at least one processor is configured to detect transition edges of the first signal and the second signal. The at least one processor is configured to, at each detected transition edge of the first output signal and the second output signal, determine whether two synchronous edges are detected, the two synchronous edges include a first transition edge of the first signal being synchronous with a second transition edge of the second signal. On a condition that the two synchronous edges are detected, the at least one processor is configured to determine that the normal condition is present, and, on a condition that the two synchronous edges are not detected, the at least one processor is configured to detect that the fault condition occurred.

One or more embodiments is directed to a sensor device, including: at least one first sensor element configured to generate at least one first sensor signal based on sensing a varying magnetic field; at least one second sensor element configured to generate at least one second sensor signal based on sensing the varying magnetic field, wherein the at least one first sensor signal is phase-shifted from the at least one second sensor signal; a signal processing circuit configured to generate a first pulsed signal based on the at least one first sensor signal, determine a phase-shift direction of a phase-shift between the at least one first sensor signal and the at least one second sensor signal, and generate the second pulsed signal based on the determined phase-shift direction, wherein the signal processing circuit is further configured to detect a phase-shift inversion of the phase-shift, and switch a state of the second pulsed signal in response to detecting the phase-shift inversion; a fault detector configured to detect at least one fault and generate an error signal indicating the at least one fault in response to detecting the at least one fault; and an output generator configured to receive the first pulsed signal and the second pulsed signal, receive the error signal based on a first condition that the fault detector detects the at least one fault, and simultaneously output a first output signal and a second output signal. Based on a second condition that the fault detector does not detect the at least one fault, the output generator is configured to output the first pulsed signal as the first output signal and output the second pulsed signal as the second output signal. In response to the first condition being satisfied, the output generator is configured to maintain the first output signal in a steady state and output the second pulsed signal as the second output signal.

One or more embodiments is directed to a sensor device, including: at least one first sensor element configured to generate at least one first sensor signal based on sensing a magnetic field component of a varying magnetic field; a signal processing circuit configured to generate a first pulsed signal based on the at least one first sensor signal and generate a second pulsed signal in duplicate to the first pulsed signal; a fault detector configured to detect at least one first fault and generate a first error signal indicating the at least one first fault in response to detecting the at least one first fault; and an output generator configured to receive the first pulsed signal and the second pulsed signal, receive the first error signal based on a first condition that the fault detector detects the at least one first fault, and simultaneously output a first output signal and a second output signal. Based on a second condition that the fault detector does not detect the at least one first fault, the output generator is configured to output the first pulsed signal as the first output signal. In response to the first condition being satisfied, the output generator is configured to maintain the first output signal in a steady state and output the second pulsed signal as the second output signal.

One or more embodiments is directed to a sensor device, including: at least one first sensor element configured to generate at least one first sensor signal based on sensing a magnetic field component of a varying magnetic field; a signal processing circuit configured to generate a first pulsed signal based on the at least one first sensor signal and generate a second pulsed signal in duplicate to the first pulsed signal; a fault detector configured to detect at least one first fault and generate a first error signal indicating the at least one first fault in response to detecting the at least one first fault, detect at least one second fault and generate a second error signal indicating the at least one second fault in response to detecting the at least one second fault, detect at least one third fault and generate a third error signal indicating the at least one third fault in response to detecting the at least one third fault, and detect at least one fourth fault and generate a fourth error signal indicating the at least one first fourth in response to detecting the at least one fourth fault; and an output generator configured to receive the first pulsed signal and the second pulsed signal, receive the first error signal based on a first condition that the fault detector detects the at least one first fault, receive the second error signal based on a second condition that the fault detector detects the at least one second fault, receive the third error signal based on a third condition that the fault detector detects the at least one third fault, receive the fourth error signal based on a fourth condition that the fault detector detects the at least one fourth fault, and simultaneously output a first output signal and a second output signal. Based on a fifth condition that the fault detector does not detect the at least one first fault, the at least one second fault, the at least one third fault, or the at least one fourth fault, the output generator is configured to output the first pulsed signal as the first output signal and output the second pulsed signal as the second output signal. In response to the first condition being satisfied, the output generator is configured to maintain the first output signal in a high steady state and output the second pulsed signal as the second output signal. In response to the second condition being satisfied, the output generator is configured to maintain the first output signal in a low steady state and output the second pulsed signal as the second output signal. In response to the third condition being satisfied, the output generator is configured to maintain the second output signal in the high steady state and output the first pulsed signal as the first output signal. In response to the fourth condition being satisfied, the output generator is configured to maintain the second output signal in the low steady state and output the first pulsed signal as the first output signal.

BRIEF DESCRIPTION OF THE DRAWINGS

Embodiments are described herein making reference to the appended drawings.

FIG. 10B is a diagram of a measurement signal and corresponding output signals in the occurrence of no fault and in the occurrence of at least one fault according to the embodiment of FIG. 9.

DETAILED DESCRIPTION

Figure 1:
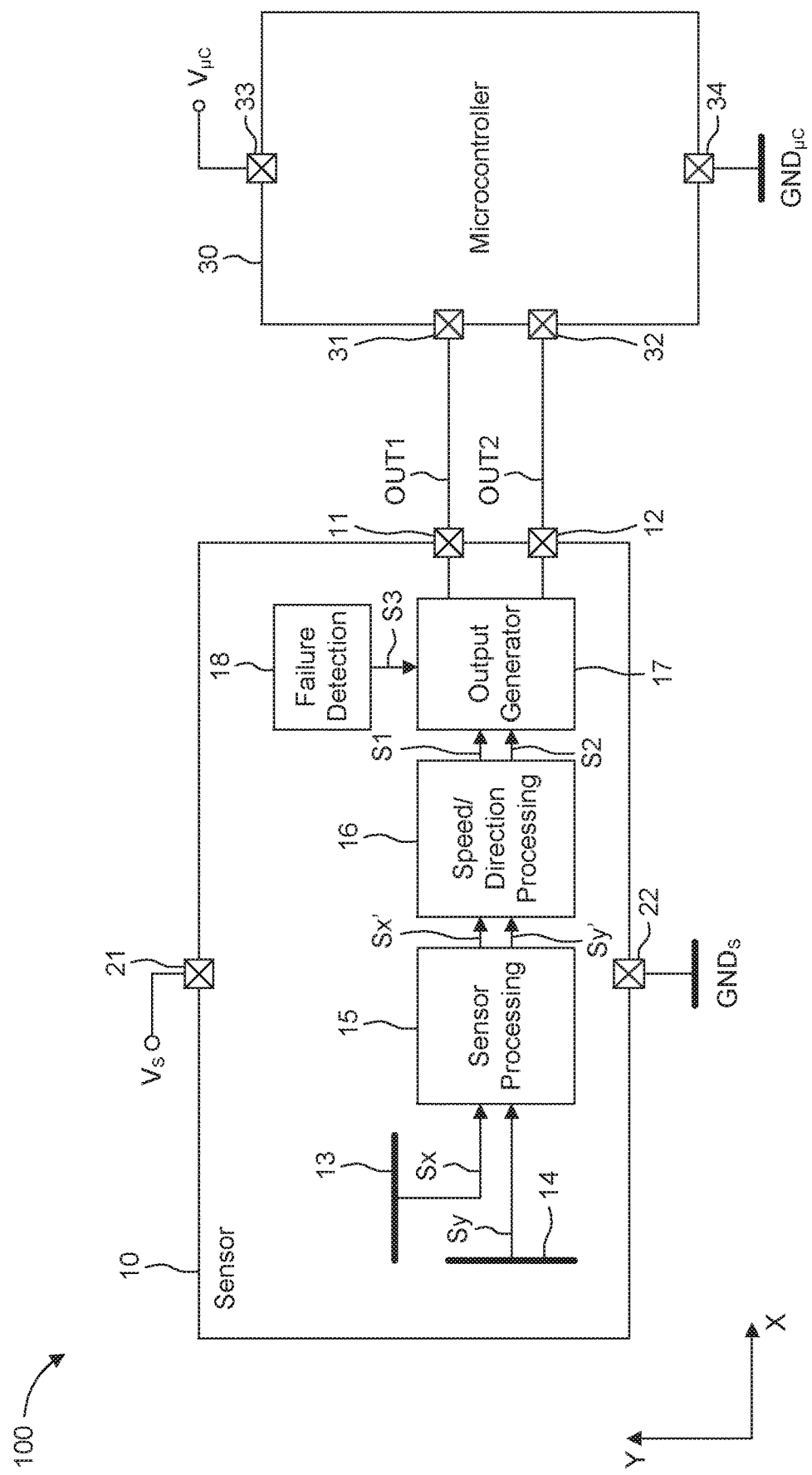
FIG. 1 is a schematic block diagram of a sensor system including a 2D magnetic sensor according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

A sensor may refer to a component which converts a physical quantity to be measured to an electric signal, for example, a current signal or a voltage signal. The physical quantity may for example comprise a magnetic field, an electric field, a pressure, a force, a temperature, a current, or a voltage, but is not limited thereto. A sensor device, as described herein, may be a voltage sensor, a current sensor, a temperature sensor, a magnetic sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

Magnetic sensors include magnetoresistive sensors, inductive sensors, and Hall-effect sensors (Hall sensors), for example. Magnetoresistance is a property of a material to change the value of its electrical resistance when an external magnetic field is applied to it. Some examples of magnetoresistive effects are Giant Magneto-Resistance (GMR), which is a quantum mechanical magnetoresistance effect observed in thin-film structures composed of alternating ferromagnetic and non-magnetic conductive layers, Tunnel Magneto-Resistance (TMR), which is a magnetoresistive effect that occurs in a magnetic tunnel junction (MTJ), which is a component consisting of two ferromagnets separated by a thin insulator, or Anisotropic Magneto-Resistance (AMR), which is a property of a material in which a dependence of electrical resistance on the angle between the direction of electric current and direction of magnetization is observed. For example, in the case of AMR sensors, a resistance for an AMR sensor element changes according to a square of a sine of an angle of the magnetic field component projected on a sensing axis of the ARM sensor element.

The plurality of different magnetoresistive effects is commonly abbreviated as xMR, wherein the "x" acts as a placeholder for the various magnetoresistive effects. xMR sensors can detect the orientation of an applied magnetic field by measuring sine and cosine angle components with monolithically integrated magnetoresistive sensor elements.

Magnetoresistive sensor elements of such xMR sensors typically include a plurality of layers, of which at least one layer is a reference layer with a reference magnetization (i.e., a reference direction). The reference magnetization provides a sensing direction corresponding to a sensing axis of the xMR sensor, thereby making the sensor element to a magnetic field component aligned in the sensing direction. A magnetic field component may be, for example, an x-magnetic field component (Bx), a y-magnetic field component (By), or a z-magnetic field component (Bz), where the Bx and By field components are in-plane to the chip, and Bz is out-of-plane to the chip in the examples provided. Accordingly, if a magnetic field component points exactly in the same direction as the reference direction, a resistance of the xMR sensor element is at a maximum, and, if a magnetic field component points exactly in the opposite direction as the reference direction, the resistance of the xMR sensor element is at a minimum.

In some applications, an xMR sensor includes a plurality of magnetoresistive sensor elements, which have the same or different reference magnetizations. Examples of such applications, in which various reference magnetizations are used, are angle sensors, compass sensors, or specific types of speed sensors (e.g., speed sensors in a bridge arrangement referred to as monocells).

By way of example, such magnetoresistive sensor elements are used in speed, angle, or rotational speed measuring apparatuses, in which magnets may be moved relative to an magnetoresistive sensor elements and hence the magnetic field at the location of the magnetoresistive sensor element changes in the case of movement, which, in turn, leads to a measurable change in resistance. For the purposes of an angle sensor, a magnet or a magnet arrangement may be applied to a rotatable shaft and an xMR sensor may be arranged stationary in relation thereto.

A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby, a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

A vertical Hall sensor is a magnetic field sensor constructed with the Hall element perpendicular to the plane of the chip (e.g., extending from a main surface of the chip into the chip body). It senses magnetic fields perpendicular to its defined sensitive edge (top, right, or left, relative to the main surface of the chip). This generally means that a vertical Hall sensor is sensitive to a magnetic field component that extends parallel to their surface and parallel, or in-plane, to the main surface of the chip in which the vertical Hall sensor is integrated. In particular, a vertical Hall sensor may extend from the main surface into the chip. The plane of sensitivity may be referred to herein as a "sensitivity-axis" or "sensing axis" and each sensing axis has a reference direction. For vertical Hall sensor elements, voltage values output by the sensor elements change according to the magnetic field strength in the direction of its sensing axis.

On the other hand, a lateral (planar) Hall sensor is constructed with the Hall element in the same plane as the main surface of the chip. It senses magnetic fields perpendicular to its planar surface. This means they are sensitive to magnetic fields vertical, or out-of-plane, to the main surface of the chip. The plane of sensitivity may be referred to herein as a "sensitivity-axis" or "sensing axis" and each sensing axis has a reference direction. Similar to vertical Hall sensor elements, voltage values output by lateral Hall sensor elements change according to the magnetic field strength in the direction of its sensing axis.

According to one or more embodiments, a plurality of magnetic field sensors and a sensor circuitry may be both accommodated (i.e., integrated) in the same chip. The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field.

In some cases, a measurement signal may be differential measurement signal that is derived from sensor signals generated by two sensor elements having a same sensing axis (e.g., two sensor elements sensitive to the same magnetic field component) using differential calculus. A differential measurement signal provides robustness to homogenous external stray magnetic fields.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, a chip, which may also be referred to as an integrated circuit (IC), may include a circuit that conditions and amplifies the small signal of one or more magnetic field sensor elements via signal processing and/or conditioning.

A sensor device, as used herein, may refer to a device which includes a sensor and sensor circuit as described above. A sensor device may be integrated on a single semiconductor die (e.g., silicon die or chip). Thus, the sensor and the sensor circuit are disposed on the same semiconductor die.

FIG. 1 is a schematic block diagram of a sensor system 100 including a 2D magnetic sensor according to one or more embodiments. The sensor system 100 includes a magnetic sensor 10 configured to generate two output signals OUT1 and OUT2 and microcontroller 30 configured to receive the two output signals OUT1 and OUT2 for additional analysis and/or processing.

Accordingly, the magnetic sensor 10 includes a first output pin 11 configured to output the first output signal OUT1 and a second output pin 12 configured to output the second output signal OUT2. The magnetic sensor 10 is a single semiconductor die (e.g., silicon die or chip), with each of its respective components integrated thereon. The magnetic sensor 10 also includes supply pins 21 and 22 configured to receive a first supply potential (e.g., voltage supply Vs) and a second supply potential (e.g., ground GND), respectively.

The microcontroller 30 includes input pins 31 and 32 for receiving the output signals OUT1 and OUT2, respectively, and two supply pins 33 and 34 configured to receive a first supply potential (e.g., voltage supply Vμc) and a second supply potential (e.g., ground GNDμc), respectively. The microcontroller 30 is configured to analyze the output signals OUT1 and OUT2, including detecting and decoding a fault indicated by one of the output signals OUT1 or OUT2.

The first output signal OUT1 may be a speed signal and the second output signal OUT2 may be a direction signal, or vice versa. Furthermore, diagnosis information may be generated my modifying one of the output signals OUT1 or OUT2. Thus, the magnetic sensor 10 is speed sensor capable of providing speed and diagnosis information with a maximum usage of two output pins 11 and 12 with the benefit of reduced cost and complexity. Additionally, the magnetic sensor 10 may additionally be configured to provide direction information with a maximum usage of two output pins 11 and 12 and with the benefit of reduced cost and complexity.

The magnetic sensor 10 shown in the example of FIG. 1 is a two-dimensional (2D) magnetic sensor that includes a first sensor element 13 and a second sensor element 14. "2D" means that the sensor is configured to sense magnetic fields in only two sensing directions. The sensor elements 13 and 14 may be xMR sensor elements, inductive sensor elements, Hall sensor elements, or any other magnetic sensor element that generates sensor signals in response to a magnetic field. In particular, the first sensor element 13 may be an x-sensor that has a sensitivity axis (i.e., its sensitivity direction) aligned in an x-direction and generates sensor signals Sx in response to an x-component Bx of the magnetic field. In contrast, the second sensor element 14 may be a y-sensor that has a sensitivity axis (i.e., its sensitivity direction) aligned in an y-direction and generates sensor signals Sy in response to a y-component By of the magnetic field. Thus, the sensitivity axes of the first sensor element 13 and the second sensor element 14 are orthogonal to each other. As a result, the sensor signals generated the sensor elements 13 and 14 are shifted with respect to each other by 90°.

For example, the sensor signals generated by the sensor element 13 may be sinusoidal and the sensor signals generated by the sensor element 14 may be cosinusoidal relative to the sensor signals generated by the sensor element 13. Together, the sensor elements 13 and 14 sense a change in the x-axis and y-axis magnetic field strength that varies as a sinusoidal waveform (i.e., as a signal modulation), the frequency of which corresponds to either a speed of rotation of a rotating target object, such as a wheel or drive shaft.

In addition, it will be appreciated that the first sensor element 13 and the second sensor element 14 may each be comprised of one or more sensing elements. For example, in the event that the first sensor element 13 and the second sensor element 14 include two or more sensing elements, the sensing elements of each respective sensor element 13 and 14 may be arranged in a differential configuration and/or a bridge configuration.

Figure 5A:
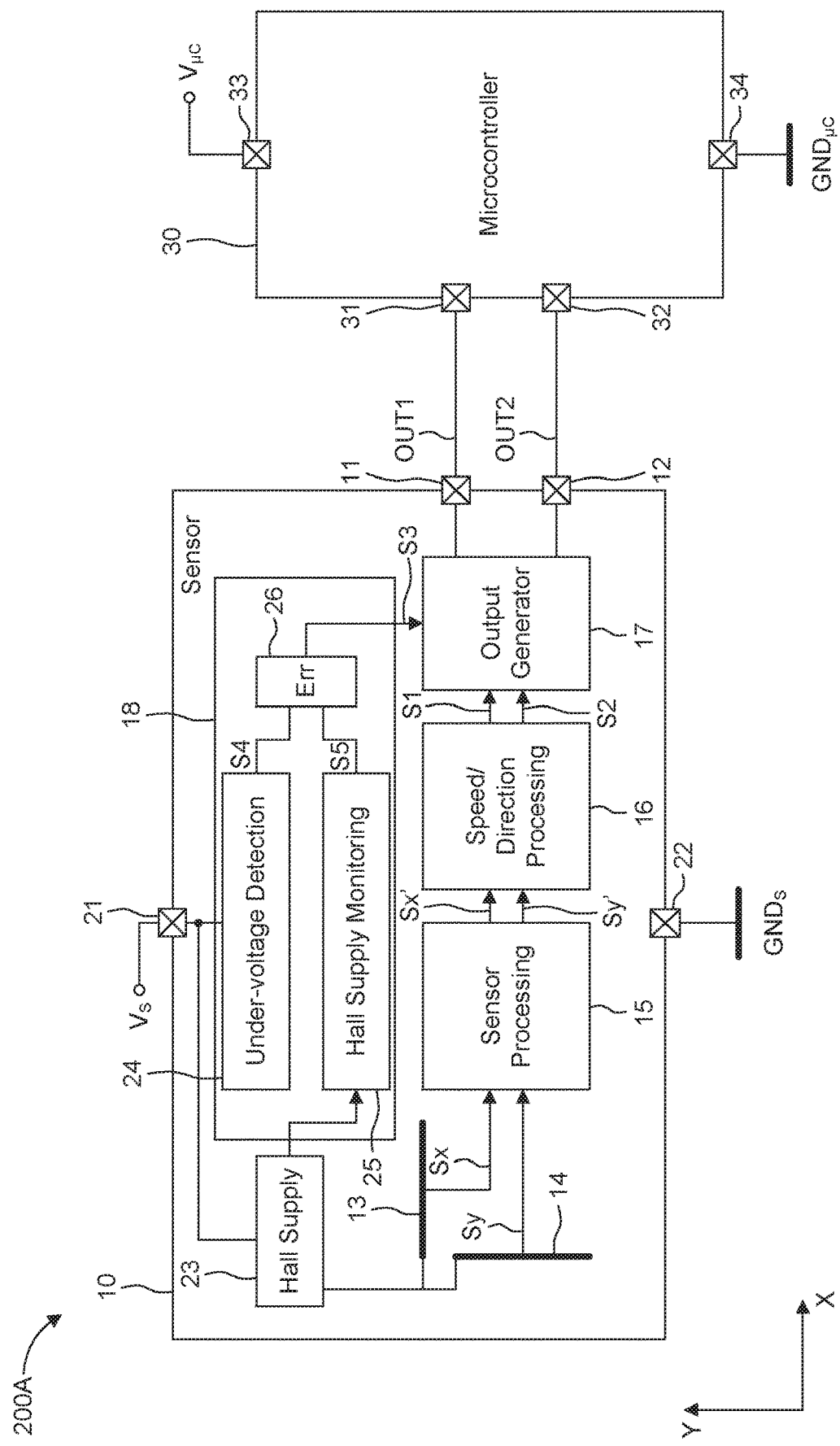
FIG. 5A is a schematic block diagram of a sensor system including a 2D magnetic sensor according to one or more embodiments.
Figure 5B:
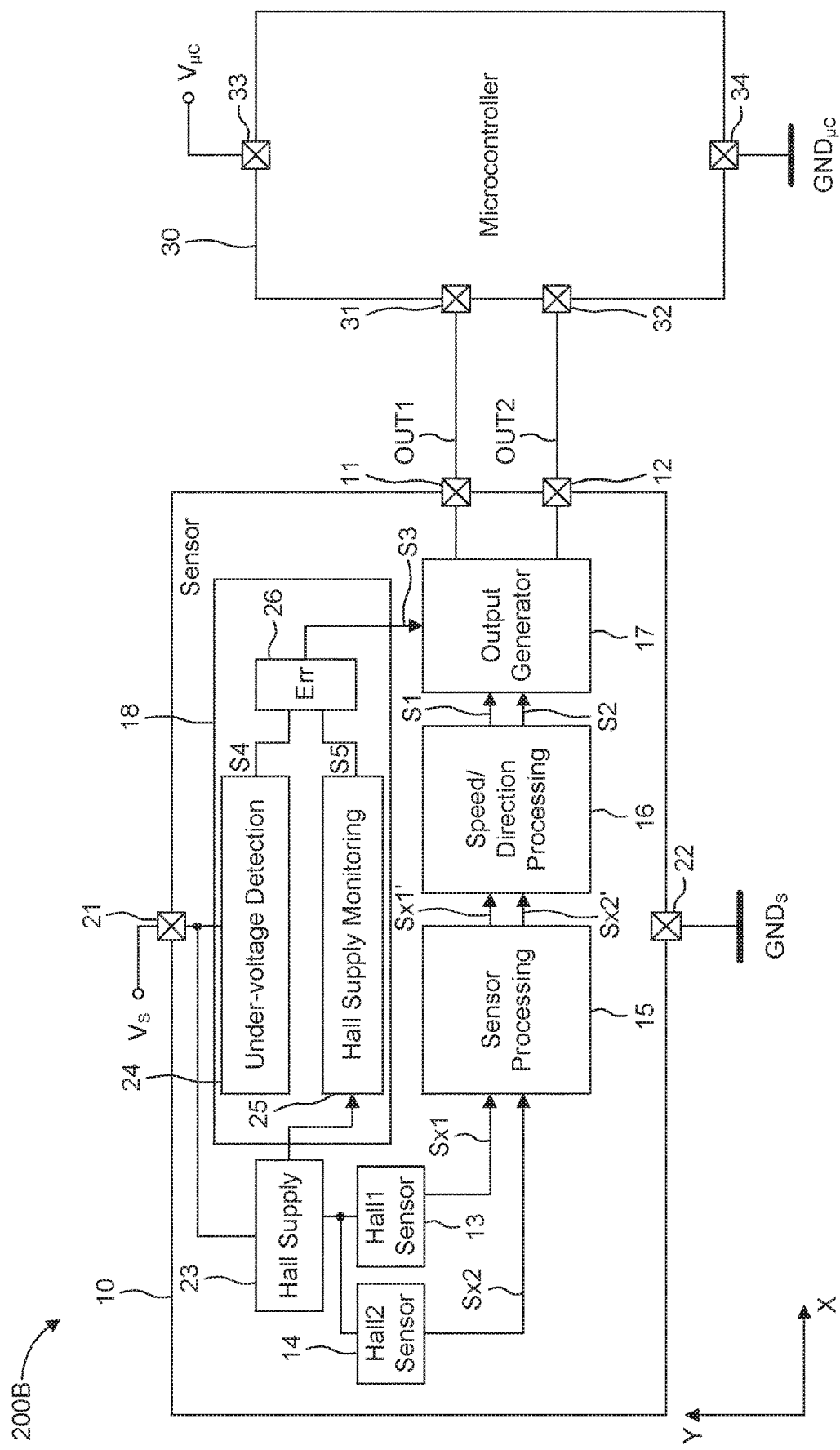
FIG. 5B is a schematic block diagram of a sensor system including a 1D magnetic sensor according to one or more embodiments.

While a 2D magnetic sensor is shown in FIG. 1, in other examples such as the example shown in FIG. 5B, the magnetic sensor 10 may be a one-dimensional speed sensor in which the two sensor elements are Hall sensor elements configured to sense magnetic fields in a same sensing direction. In this case, the two Hall sensor elements are laterally spaced apart in the sensing direction by a lateral distance. As a result, the two Hall sensor elements generate sensor signals Sx1 and Sx2, respectively, that are phase-shifted with respect to each other with the phase-shift being proportional to the lateral distance. This phase-shift can be used to sense a rotation direction of a rotating magnetic field, and, more specifically, a rotation direction of a target object.

Turning back to FIG. 1, the magnetic sensor 10 includes a sensor processing circuit 15 configured to receive the analog sensor signals from the sensor elements 13 and 14, and perform signal processing and/or conditioning thereon. For example, the sensor processing circuit 15 may generate a first measurement signal Sx' from sensor signals received from the first sensor element 13 and a second measurement signal Sy' from sensor signals received from the first sensor element 13. For example, the sensor processing circuit 15 include analog-to-digital converters (ADCs) that converts the analog sensor signals Sx and Sy into digital sensor signals Sx' and Sy'. The sensor processing circuit 15 may also include a digital signal processor (DSP) that performs some processing on the digital sensor signals Sx' and Sy'.

Additionally, or alternatively, the sensor processing circuit 15 may generate the first measurement signal Sx' as a first differential measurement signal Sx' from sensor signals received from the first sensor element 13 using a differential calculation that may be used to cancel out homogeneous stray-fields in a sensor plane direction. Similarly, the sensor processing circuit 15 may generate the second measurement signal Sy' as a second differential measurement signal Sy' from sensor signals received from the second sensor element 14. To derive a differential measurement signal, sensor signals from at least two sensing elements that are sensitive to the same magnetic field component are used.

The measurement signals Sx' and Sy' are output from the sensor processing circuit 15 and provided to a speed and direction processing circuit 16. In this example, the speed and direction processing circuit 16 uses the measurement signal Sx' as a speed signal and uses the measurement signal Sy' as a direction signal. However, the roles could be reversed. Additionally, if the measurement signals Sx' and Sy' are analog signals, the speed and direction processing circuit 16 may include ADCs to convert the signals into the digital domain.

The speed and direction processing circuit 16 analyses the measurement signal Sx' and generates a pulsed output signal S1. In particular, the speed and direction processing circuit 16 may include a current modulator, also referred to as a protocol generator, that receives the measurement signal Sx' and generates the output signal S1 as an output current according to a programmed current switching protocol or rule set build out of, for example, comparators. The output current may be between two current values in order to generate current pulses. The frequency of the current pulses are directly related to the speed of the target object.

The speed and direction processing circuit 16 also analyses the measurement signal Sy' and generates a pulsed output signal S2. The pulsed output signal S2 has a same frequency as the pulsed output signal S1. However, the pulses of the pulsed output signal S2 are either in-phase with the pulses of the pulsed output signal S1 (i.e., with zero phase-shift) or completely out-of-phase with the pulses of the pulsed output signal S1 (i.e., with a 180° phase-shift) depending on the movement direction of the target object. For example, for a rotating target object, the edges of the pulses of the S1 and S2 signals may be aligned and in-phase with each other on a condition that the target object is rotating in first direction (e.g., counterclockwise). In contrast, the edges of the pulses of the S1 and S2 signals may be aligned and out-of-phase with each other on a condition that the target object is rotating in a second direction (e.g., clockwise). The speed and direction processing circuit 16 may determine the direction based on whether the 90° phase-shift between the measurement signals Sx' and Sy' (i.e., between the sensor signals Sx and Sy) is positive or negative.

The magnetic sensor 10 further includes an output generator 17 and a fault detector 18. The output generator 17 is configured to monitor for an error signal S3 generated by the fault detector 18 in response to a detected fault in the magnetic sensor 10.

On a first condition that no error signal S3 is received, the output generator 17 may receive the S1 and S2 signals and pass the signals along to their respective output pins 11 and 12 with some or no additional signal processing or conditioning. As a result, the first output signal OUT1 is representative of the pulsed output signal S1 and the second output signal OUT2 is representative of the pulsed output signal S2. As noted above, the pulsed output signal S1 and the pulsed output signal S2 have edge transitions that occur at the same time, regardless of whether the signals are in-phase or 180° out-of-phase. Similarly, the output signals OUT1 and OUT2 are pulsed output signals having pulses that are either in-phase or 180° out-of-phase of each other under the first condition. Thus, when the error signal S3 is not present, they both transition between two states at the same time.

However, on a second condition that an error signal S3 is received by the output generator 17, the output generator 17 may modify one of the S1 and S2 signals to indicate not only that a fault has occurred but also to indicate the type of fault that has occurred. For example, the fault detector 18 may monitor for two or more different types of faults or classes of faults, including an under-voltage fault or a Hall supply fault, and the fault detector 18 is configured to generate the error signal S3 that includes fault information. The fault information indicates the type of fault that has occurred or a combination of faults that has occurred.

In some embodiments, the fault detector 18 may be used to monitor for one specific fault or two specific faults and generate the error signal S3 upon detection of one of those specific faults. Alternatively, the fault detector 18 may be used to monitor for the occurrence of any fault or any combination of possible faults, and generate the error signal S3 upon detection of any fault or one or more combinations of faults. For example, the fault detector 18 may monitor for a first type of fault or a first combination of faults and may monitor for s second type of fault or a second combination of faults. Thus, any type of fault detection based on one or more faults is possible.

In response to receiving the error signal S3, the output generator 17 determines the type of fault based on the fault information and determines which output signal to modify based on the determined fault. For example, based on the occurrence of a first fault type, the output generator 17 may decide to modify the pulsed output signal S1 such that the output signal OUT1 remains in a steady state (i.e., a continuously stable signal that no longer switches between output states) or a transition edge of output signal OUT1 is no longer synchronized with a transition edge of output signal OUT2. A combination of the two modifications may also be used.

Similarly, based on the occurrence of a second fault type, the output generator 17 may decide to modify the pulsed output signal S2 such that the output signal OUT2 remains in a steady state or a transition edge of the output signal OUT2 is no longer synchronized with a transition edge of output signal OUT1. A combination of the two modifications may also be used.

The microcontroller 30 is configured to receive the two output signals OUT1 and OUT2 at two corresponding input pins 21 and 22 and monitor for a fault based on analyzing and interpreting the two output signals OUT1 and OUT2. In particular, when a fault in the magnetic sensor 10 occurs, one of the two output signals OUT1 or OUT2 will be purposefully manipulated by the output generator 17 based on the error signal S3. The microcontroller 30 is configured to perform edge detection on both output signals OUT1 and OUT2, and perform an edge analysis at each detected edge of each output signal OUT1 and OUT2. If the microcontroller 30 detects that an edge transition occurs in one signal without a simultaneous edge transition occurring in the other signal, the microcontroller 30 determines that a fault has occurred. The microcontroller 30 may determine the type of fault that has occurred based on a further analysis of the two output signals OUT1 and OUT2. Thus, at least two types of faults can be communicated to the microcontroller 30 by the magnetic sensor 10 by using the two output signals OUT1 and OUT2 and the fault can be detected and its type identified by the microcontroller 30.

Figure 2:
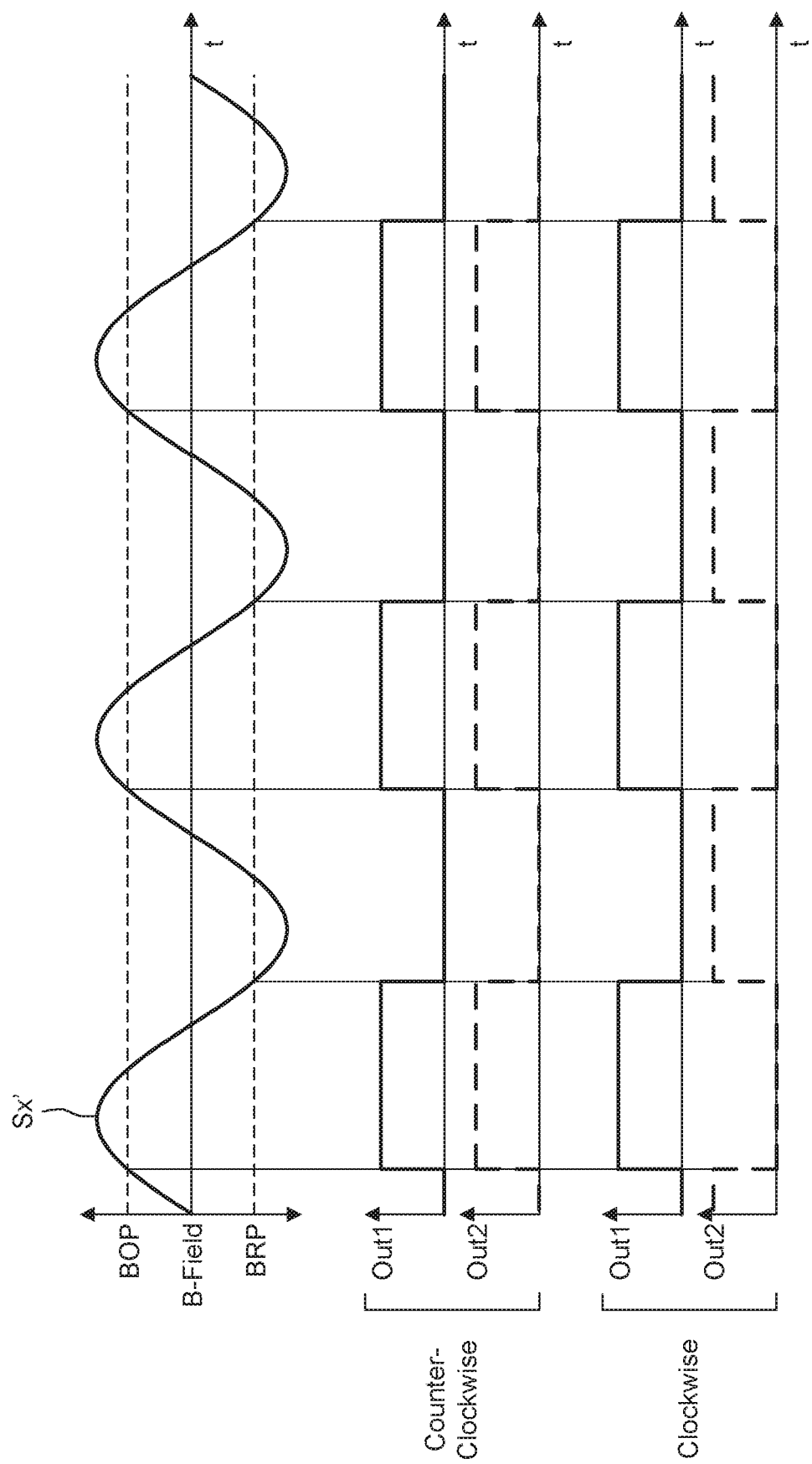
FIG. 2 is a diagram of a measurement signal and corresponding output signals in the occurrence of no fault according to one or more embodiments.

FIG. 2 is a diagram of a measurement signal and corresponding output signals according to one or more embodiments. In particular, top, middle, and bottom diagrams are shown.

The top diagram of FIG. 2 is a signal diagram of a measurement signal Sx' that is representative of an oscillating magnetic field. In addition, two switching thresholds are shown. The two switching thresholds include a magnetic operating point BOP and a magnetic release point BRP. The speed and direction processing circuit 16 is configured to compare the measurement signal Sx to the two switching thresholds BOP and BRP and switch the states of the two pulsed output signals S1 and S2 at each crossing of one of the switching thresholds BOP or BRP. In the event no fault is detected by the fault detector 18, the two pulsed output signals S1 and S2 are output from the magnetic sensor 10 as output signals OUT 1 and OUT2, respectively. It is noted that the middle point between the BOP and the BRP may be referred to as a zero-crossing threshold.

The middle diagram of FIG. 2 is a signal diagram of output signals OUT1 and OUT2 simultaneously generated and output while the target object is rotating counterclockwise. In this case, the two output signals OUT1 and OUT2 switch synchronously in-phase with each other. Thus, each transition edge of one signal occurs synchronously with a transition edge of the other signal in the same direction. That is, transitions from the low-to-high states occur simultaneously and transitions from the high-to-low states occur simultaneously. In addition, the time gap between consecutive edges correspond to the speed (e.g., rotational speed) of the target object. From the output signals OUT1 and OUT2, the microcontroller 30 is able to determine that the output signals OUT1 and OUT2 are switching normally (i.e., that there is no fault), determine the speed from one of the output signals OUT1 or OUT2, and determined the rotation direction from the phase relationship between the output signals OUT1 and OUT2.

The bottom diagram of FIG. 2 is a signal diagram of output signals OUT1 and OUT2 simultaneously generated and output while the target object is rotating clockwise. In this case, the two output signals OUT1 and OUT2 switch synchronously 180° out-of-phase with each other. Thus, each transition edge of one signal occurs synchronously with a transition edge of the other signal in opposite directions. That is, a transition from a low-to-high state in one output signal occurs simultaneously with a transition from a high-to-low state in the other signal, and vice versa. In addition, the time gap between consecutive edges correspond to the speed (e.g., rotational speed) of the target object. From the output signals OUT1 and OUT2, the microcontroller 30 is able to determine that the output signals OUT1 and OUT2 are switching normally (i.e., that there is no fault), determine the speed from one of the output signals OUT1 or OUT2, and determined the rotation direction from the phase relationship between the output signals OUT1 and OUT2.

Figure 3:
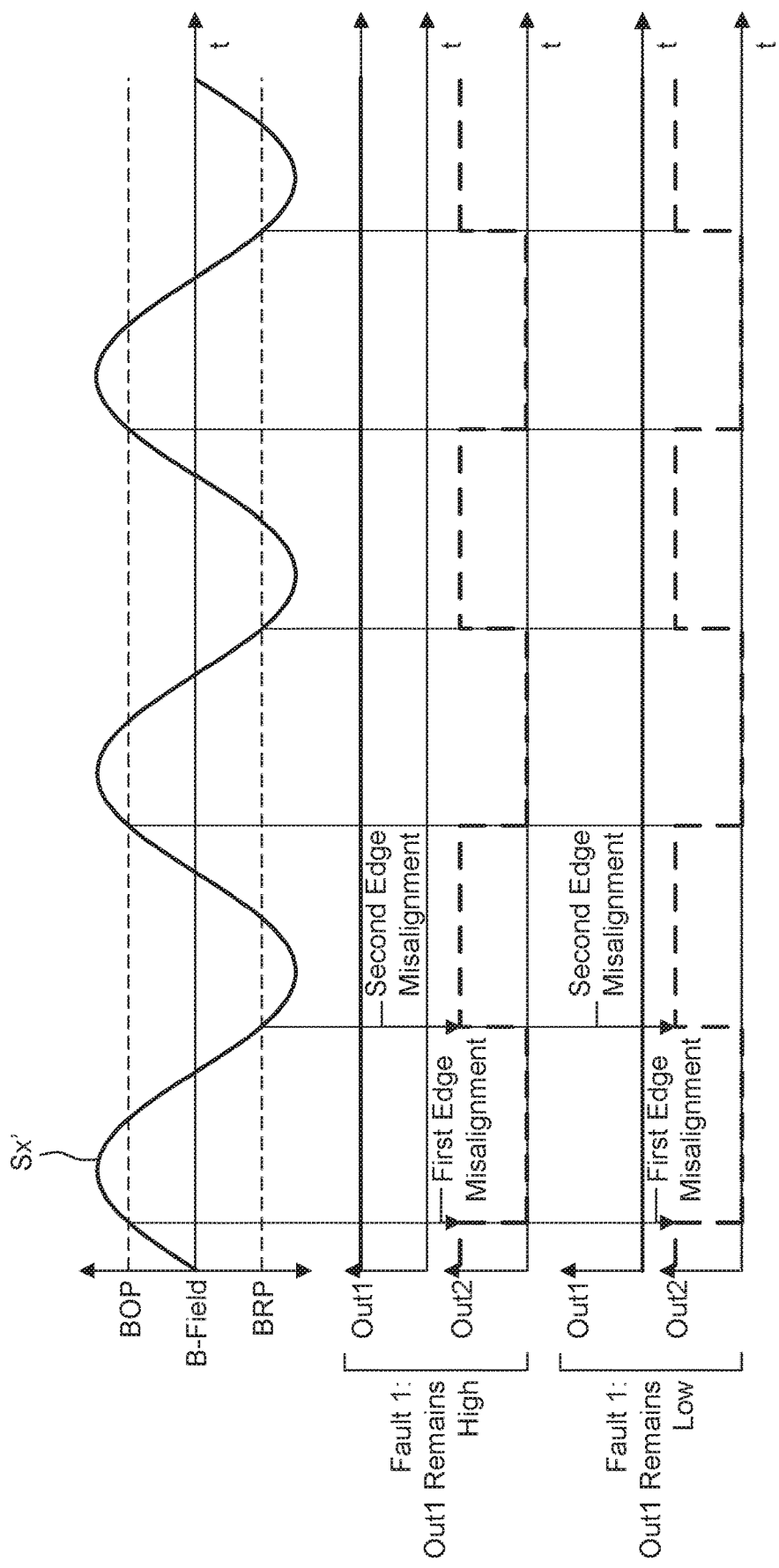
FIG. 3 is a diagram of a measurement signal and corresponding output signals in the occurrence of a fault according to one or more embodiments.

FIG. 3 is a diagram of a measurement signal and corresponding output signals according to one or more embodiments. In particular, top, middle, and bottom diagrams are shown. However, unlike in FIG. 2, the fault detector 18 has detected a fault and the output generator 17 modifies output signal OUT1 to indicate the fault. For example, the output generator 17 places the output signal OUT1 into a steady state so that it no longer switches between two states.

In particular, output signal OUT1 may be mapped to the first fault type detected by the fault detector 18 and the output generator 17 may select output signal OUT1 to be the modified output signal based on the fault information received in the error signal S3, where the fault information identifies the first fault type.

Similarly, output signal OUT2 may be mapped to the second fault type detected by the fault detector 18 and the output generator 17 may select output signal OUT2 to be the modified output signal based on the fault information received in the error signal S3, where the fault information identifies the second fault type. In the case of FIG. 3, output signal OUT1 indicates the fault while output signal OUT2 continues to switch as normal based on the pulsed output signal S2. However, these roles may be reversed depending on the type of fault detected.

Like the top diagram of FIG. 2, the top diagram of FIG. 3 is a signal diagram of a measurement signal Sx' that is representative of an oscillating magnetic field.

The middle and bottom diagrams of FIG. 3 are two ways to indicate the same fault (i.e., the first fault type).

In the middle diagram, the output generator 17 places the output signal OUT1 in a high steady state. This may be due to the output generator 17 receiving the error signal S3 when the pulsed output signal S1, and consequently the output signal OUT1, is in the high state. As a result, the output generator 17 maintains the output signal OUT1 in its current state at the time the error signal S3 is received. The output generator 17 ignores the pulsed output signal S1 upon receiving the error signal S3, as it no longer influences the output signal OUT1.

In the bottom diagram, the output generator 17 places the output signal OUT1 in a low steady state for similar reasons. In particular, the output generator 17 may receive the error signal S3 when the pulsed output signal S1, and consequently the output signal OUT1, is in the low state at which the output generator 17 places a hold on the signal switching.

A similar process is performed on the output signal OUT2 in the event that a second fault type, different from the first fault type, is detected. In this case, output signal OUT1 continues to switch as normal based on the pulsed output signal S1, whereas output signal OUT2 is placed in a steady state.

The microcontroller 30 receives the two output signals OUT1 and OUT2 and detects that one output signal is still switching and the other is in a steady state. As noted above, the microcontroller 30 performs an edge detection analysis when it detects a transition edge in either output signal OUT1 and/or OUT2. Since output signal OUT2 is still switching, the microcontroller 30 detects a transition edge in output signal OUT2 and further determines that a corresponding, synchronous transition edge in output signal OUT1 did not occur. As a result, the microcontroller 30 may determine that output signal OUT1 is no longer switching (i.e., is in a steady state) based on this first edge misalignment. In response to determining that output signal OUT1 is in a steady state, the microcontroller 30 identifies output signal OUT1 as an error signal and determines the type of fault based on the mapping information between fault types and output signals OUT1 and OUT2. Here, microcontroller 30 identifies the fault as corresponding to the first fault type correspond to output signal OUT1

Additionally, the microcontroller 30 may detect a first edge misalignment, as described above, in order to detect a possible fault, and may detect a second edge misalignment at the next transition edge of the output signal OUT2 to confirm that output signal OUT1 is in a steady state, thereby confirming the existence of the fault before taking further action. This additional step may help prevent detecting false faults.

Additionally, the microcontroller 30 may still use the output signal that is switching normally to calculate the speed of the target object. However, a determination on direction is no longer possible while one of the output signals is in a steady state.

Figure 4:
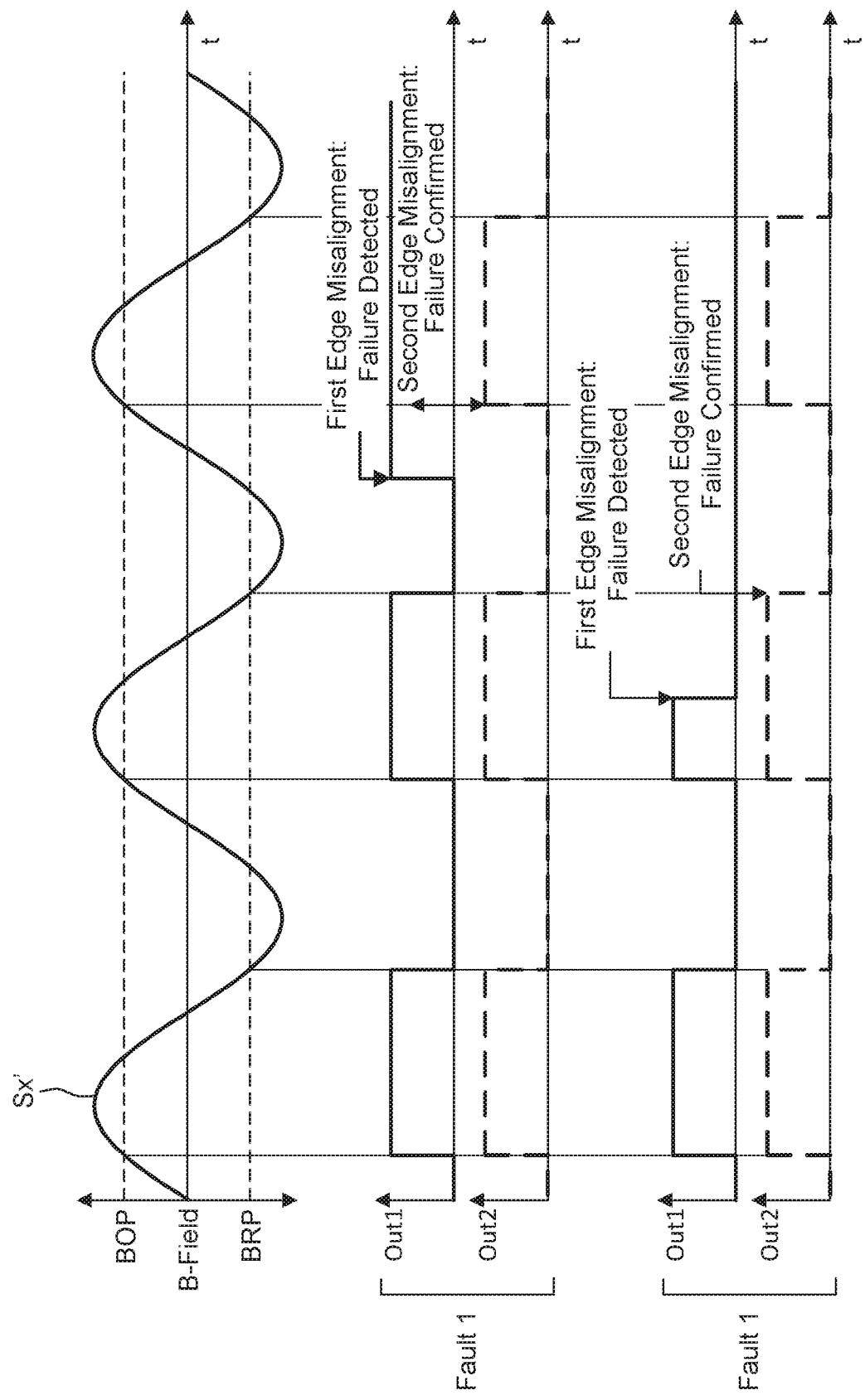
FIG. 4 is a diagram of a measurement signal and corresponding output signals in the occurrence of a fault according to one or more embodiments.

FIG. 4 is a diagram of a measurement signal and corresponding output signals according to one or more embodiments. In particular, top, middle, and bottom diagrams are shown. However, unlike in FIG. 2, the fault detector 18 has detected a fault and the output generator 17 modifies output signal OUT1 or output signal OUT2 to indicate the fault. For example, the output generator 17 modifies a switching pattern of either output signal OUT1 or output signal OUT2 such that their edge transitions are no longer synchronized with each other.

Output signal OUT1 may be mapped to the first fault type detected by the fault detector 18 and the output generator 17 may select output signal OUT1 to be the modified output signal based on the fault information received in the error signal S3, where the fault information identifies the first fault type. Similarly, output signal OUT2 may be mapped to the second fault type detected by the fault detector 18 and the output generator 17 may select output signal OUT2 to be the modified output signal based on the fault information received in the error signal S3, where the fault information identifies the second fault type. In the case of FIG. 4, output signal OUT1 indicates the fault while output signal OUT2 continues to switch as normal based on the pulsed output signal S2. However, these roles may be reversed depending on the definition.

Like the top diagram of FIG. 2, the top diagram of FIG. 3 is a signal diagram of a measurement signal Sx' that is representative of an oscillating magnetic field.

The middle and bottom diagrams of FIG. 3 are two ways to indicate the same fault (i.e., the first fault type).

In the middle diagram, the output generator 17 initiates a transition to place the output signal OUT1 into a high steady state. In other words, in response to receiving an error signal S3 indicating a fault type mapped to output signal OUT1, the output generator 17 causes the output signal OUT1 to transition to its opposite state, thereby triggering an edge transition that is out of synchronization with an edge transition of output signal OUT2. The triggered edge in output signal OUT1 may be made at the time the error signal S3 is received, thereby disregarding the pulsed output signal S1. Thus, output signal OUT2 continues to switch as normal based on the pulsed output signal S2, whereas output signal OUT1 is placed in a steady state.

The microcontroller 30 is configured to detect the edge transition in output signal OUT1 and determine that a corresponding, synchronous edge transition has not occurred in output signal OUT2, thereby indicating that first edge misalignment has occurred. In response to detecting the first edge misalignment, the microcontroller 30 detects a possible fault. However, the microcontroller 30 requires additional information to determine which output signal is signaling the fault.

Since output signal OUT2 continues to switch as normal based on the pulsed output signal S2, the microcontroller 30 can use output signal OUT2 to confirm that output signal OUT1 is in a steady state, thereby confirming the existence of the fault. For example, the microcontroller 30 will detect a second edge misalignment at the next edge transition of the output signal OUT2 that follows the first edge misalignment. Here, the microcontroller 30 can confirm that output signal OUT2 is still toggling and that output signal OUT1 is in a steady state. In other words, the output signal that has an edge transition after the first edge misalignment is detected, is determined to be the normal operating signal and the other signal is determined to be signaling the fault.

In response to determining that output signal OUT1 is in a steady state, the microcontroller 30 identifies output signal OUT1 as an error signal and determines the type of fault based on the mapping information between fault types and output signals OUT1 and OUT2. Here, microcontroller 30 identifies the fault as corresponding to the first fault type correspond to output signal OUT1.

In the bottom diagram, the output generator 17 initiates a transition to place the output signal OUT1 into a low steady state. In other words, in response to receiving an error signal S3 indicating a fault type mapped to output signal OUT1, the output generator 17 causes the output signal OUT1 to transition to its opposite state, thereby triggering an edge transition that is out of synchronization with an edge transition of output signal OUT2. The triggered edge in output signal OUT1 may be made at the time the error signal S3 is received, thereby disregarding the pulsed output signal S1. Thus, output signal OUT2 continues to switch as normal based on the pulsed output signal S2, whereas output signal OUT1 is placed in a steady state. The microcontroller 30 proceeds to detect the two edge misalignments to confirm and identify the fault, in a similar manner described above.

Since the output signal OUT1 is mapped to one type of fault, both middle and bottom diagrams of FIG. 4 indicate the same type of fault. Additionally, the microcontroller 30 may still use the output signal that is switching normally to calculate the speed of the target object. However, a determination on direction is no longer possible while one of the output signals is in a steady state.

FIG. 5A is a schematic block diagram of a sensor system 200A including a 2D magnetic sensor according to one or more embodiments. The sensor system 200A is similar to the sensor system 100, but further elaborates on one possible configuration of the fault detector 18. Thus, features being the same or similar to those in sensor system 100 will not be described again.

In this example, sensor elements 13 and 14 are Hall sensor elements. Accordingly, the magnetic sensor 10 includes a Hall voltage supply 23 that is configured to provide a DC voltage to each of Hall sensor elements 13 and 14. The supplied DC voltage generates a current that passes through each sensor element and ultimately results in a Hall voltage representative of a magnetic field strength of the magnetic field detected in the sensing direction. Thus, Hall voltage supply 23 provides a bias voltage to the Hall sensor elements 13 and 14.

The fault detector 18 includes an under-voltage detector 24, a Hall supply monitor 25, and an error signal generator 26.

The under-voltage detector 24 monitors the supply voltage Vs for an under voltage event. Upon detecting an under voltage event, the under-voltage detector 24 generates a first fault signal S4 and transmits the first fault signal S4 to the error signal generator 26.

The Hall supply monitor 25 monitors the Hall supply voltage for irregularities. Upon detecting a Hall supply voltage fault event, the Hall supply monitor 25 generates a second fault signal S5 and transmits the second fault signal S5 to the error signal generator 26.

The error signal generator 26 monitors for the fault signals S4 and S5, and upon receiving one of the fault signals, generates the error signal S3 that includes fault information that identifies the type of fault detected (i.e., based on whether fault signal S4 or S5 is received). The output generator 17 receives the error signal S3 and proceeds in the manner described above.

In view of the above, the following advantages may be realized: the speed, direction, and two different fault diagnosis are provided by only two pins (two wires), which is cost saving; the failure is displayed nearly immediately, so the failure reaction time is mainly determined by the system and not by the device, which provides flexibility in terms of functional safety for the system integrator; and the system requires no additional time measurements for life ticks.

FIG. 5B is a schematic block diagram of a sensor system 200B including a 1D magnetic sensor according to one or more embodiments. The sensor system 200B includes Hall sensor elements 13 and 14 that are configured to sense magnetic fields in a same sensing direction thereby generating sensor signals Sx1 and Sx2, respectively. Additionally, the two Hall sensor elements are laterally spaced apart in the sensing direction by a lateral distance. As a result, the two sensor signals Sx1 and Sx2 are phase-shifted with respect to each other with the phase-shift being proportional to the lateral distance. This phase-shift can be used to sense a rotation direction of a rotating magnetic field, and, more specifically, a rotation direction of a target object.

The sensor processing circuit 15 is configured to receive the analog sensor signals from the sensor elements 13 and 14, and generate measurement signals Sx1' and Sx2' in accordance with the above description.

The speed and direction processing circuit 16 generates a corresponding pulsed output signal S1 and S2 for each of the measurement signals Sx1' and Sx2', respectively, with synchronized edge transitions in accordance with the above description. In particular, the speed and direction processing circuit 16 analyses the measurement signal Sx1' and generates a pulsed output signal S1. In particular, the speed and direction processing circuit 16 may include a current modulator, also referred to as a protocol generator, that receives the measurement signal Sx1' and generates the output signal S1 as an output current according to a programmed current switching protocol or rule set build out of, for example, comparators. The output current may be between two current values in order to generate current pulses. The frequency of the current pulses are directly related to the speed of the target object.

The speed and direction processing circuit 16 also analyses the measurement signal Sx2' and generates a pulsed output signal S2. The pulsed output signal S2 has a same frequency as the pulsed output signal S1. However, the pulses of the pulsed output signal S2 are either in-phase with the pulses of the pulsed output signal S1 (i.e., with zero phase-shift) or completely out-of-phase with the pulses of the pulsed output signal S1 (i.e., with a 180° phase-shift) depending on the movement direction of the target object. For example, for a rotating target object, the edges of the pulses of the S1 and S2 signals may be aligned and in-phase with each other on a condition that the target object is rotating in first direction (e.g., counterclockwise). In contrast, the edges of the pulses of the S1 and S2 signals may be aligned and out-of-phase with each other on a condition that the target object is rotating in a second direction (e.g., clockwise). The speed and direction processing circuit 16 may determine the direction based on whether the phase-shift between the measurement signals Sx1' and Sx2' (i.e., between the sensor signals Sx1 and Sx2) is positive or negative.

The speed and direction processing circuit 16 may be further configured to detect a change in the rotation direction, at which time the phase-shift between the measurement signals Sx1' and Sx2' becomes inverted or reversed.

Figure 6A:
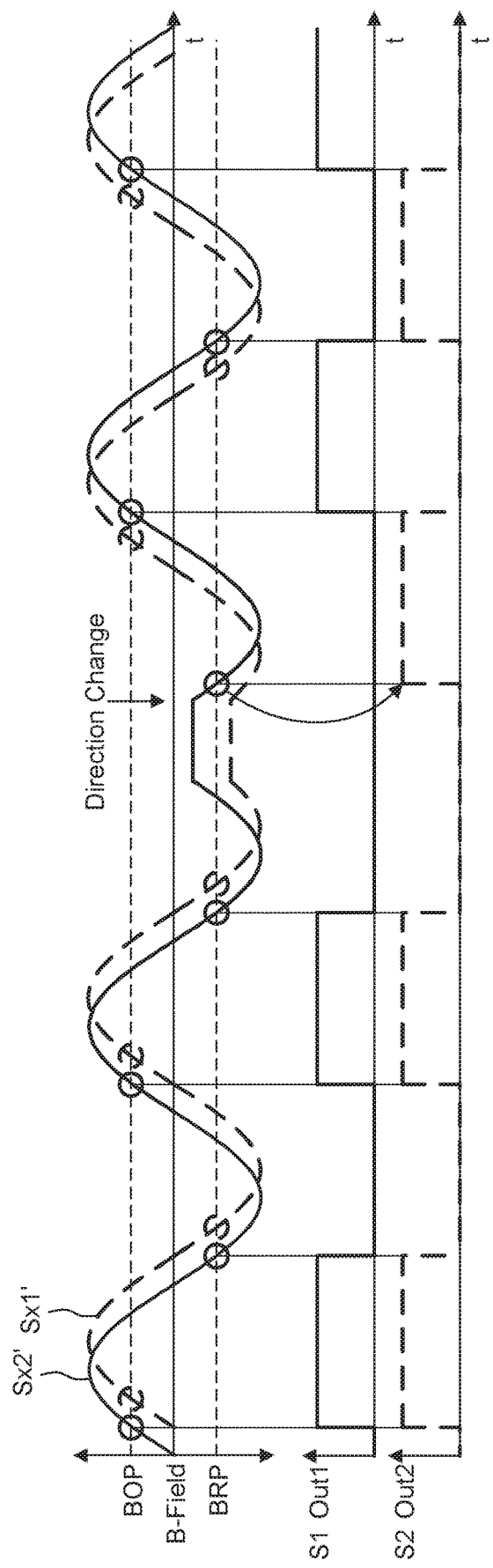
FIG. 6A is a diagram of sensor measurement signals and corresponding output signals according to the embodiment of FIG. 5B.

FIG. 6A is a diagram of sensor measurement signals and corresponding output signals according to one or more embodiments. In particular, top and bottom diagrams are shown. The top diagram illustrates two phase-shifted measurement signals Sx1' and Sx2' according to the embodiment illustrated in FIG. 5B with a rotation directional change. It will be appreciated that the two phase-shifted measurement signals Sx' and Sy' described with reference to FIGS. 1 and 5A and later with reference to FIG. 8, can be similarly applied instead of the two phase-shifted measurement signals Sx1' and Sx2'. Thus, any two phase-shifted measurement signals capable of indicating a directional change may be used and signals Sx1' and Sx2' are merely representative of one possible example for elaborating on the features described in reference to FIGS. 6A and 7.

In particular, the prior to the directional change, it can be seen that measurement signal Sx2' is lagging behind measurement signal Sx1'. In contrast, after the directional change, the phase-shift is inverted such that measurement signal Sx1' is lagging behind measurement signal Sx2'. During the directional change, both measurement signals Sx1' and Sx2' become flat or constant for a respective time interval.

The bottom diagram of FIG. 6A shows speed signal S1 (out1) and direction signal S2 (out2). Prior to the directional change, the edges of signals S1 and S2 are aligned in-phase. After the directional change, the edges of signals S1 and S2 are aligned out-of-phase, indicating the change in rotation direction.

There are a number of method the speed and direction processing circuit 16 can use to detect the phase-shift inversion between the two measurement signals Sx1' and Sx2'. One way is to evaluate the sign of the measurement signal Sx2' at each zero-crossing of the measurement signal Sx1', or vice versa. If the sign of the measurement signal Sx2' alternates (i.e., +− or −+) between two consecutive zero crossings of measurement signal Sx1', the rotation direction remains the same. However, if the sign of the measurement signal Sx2' between two consecutive zero crossings of measurement signal Sx1' stays the same and does not alternate (i.e., ++ or −−) a direction change is detected by the speed and direction processing circuit 16.

Another method used by the speed and direction processing circuit 16 to detect the direction change is to monitor both measurement signals Sx1' and Sx2' for a two consecutive crossings of a switching threshold (e.g., BOP, BRP, and/or the zero-crossing) by one measurement signal without an intervening crossing of the same switching threshold by the other measurement signal. If such a condition is satisfied, a phase-shift inversion has taken place and a direction change is detected.

For example, the BRP may be used as a switching threshold to monitor for a directional change. While the magnetic field rotates in a first direction (i.e., prior to the directional change), it can be seen that measurement signals Sx2' and Sx1' alternate in crossing the BRP. Thus, measurement signal Sx1' crosses the BRP between two consecutive crossings of the BRP by measurement signal Sx2'. In other words, measurement signal Sx1' has an intervening crossing of the BPR that occurs between two consecutive crossings of the BRP by measurement signal Sx2'.

When a change in direction occurs, that condition may not be satisfied. For example, in the case illustrated in FIG. 6A, it can be seen that measurement signal Sx2' crosses the BRP twice without an intervening crossing of the BRP by measurement signal Sx1'. This scenario indicates that a change in direction (i.e., a phase inversion) has occurred. A similar evaluation can be performed using the zero-crossing as a switching threshold and/or using the BOP as a switching threshold. Two or all three switching thresholds may be used concurrently for monitoring the crossings of both measurement signals Sx1' and Sx2.

Turning back to FIG. 5B, the fault detector 18 is configured to monitor for one or more types of faults, including any faults and any combination of all possible failures. Thus, the fault detector 18 may be used to monitor for one specific fault and generate the error signal S3 upon detection of that one specific fault. For example, one of the under-voltage detector 24 or the Hall supply monitor 25 may be selectively enabled, while the other is selectively disabled. Alternatively, the fault detector 18 may be used to monitor for the occurrence of any fault or any combination of possible faults, and generate the error signal S3 upon detection of any fault or one or more combinations of faults. Thus, any type of fault detection based on one or more faults is possible. For example, both the under-voltage detector 24 and the Hall supply monitor 25 may be enabled, and the fault detector 18 may generate the error signal S3 upon detecting either or both faults from the under-voltage detector 24 and the Hall supply monitor 25.

In this example, output signal OUT1 is used for the failure indication and is switching into a continuously stable signal when the monitored fault is detected. That is, the speed signal S1 is no longer used for the output signal OUT1 and is ignored. Output signal OUT2 is still used to indicate direction changes and is not used to indicate a fault.

Figure 6B:
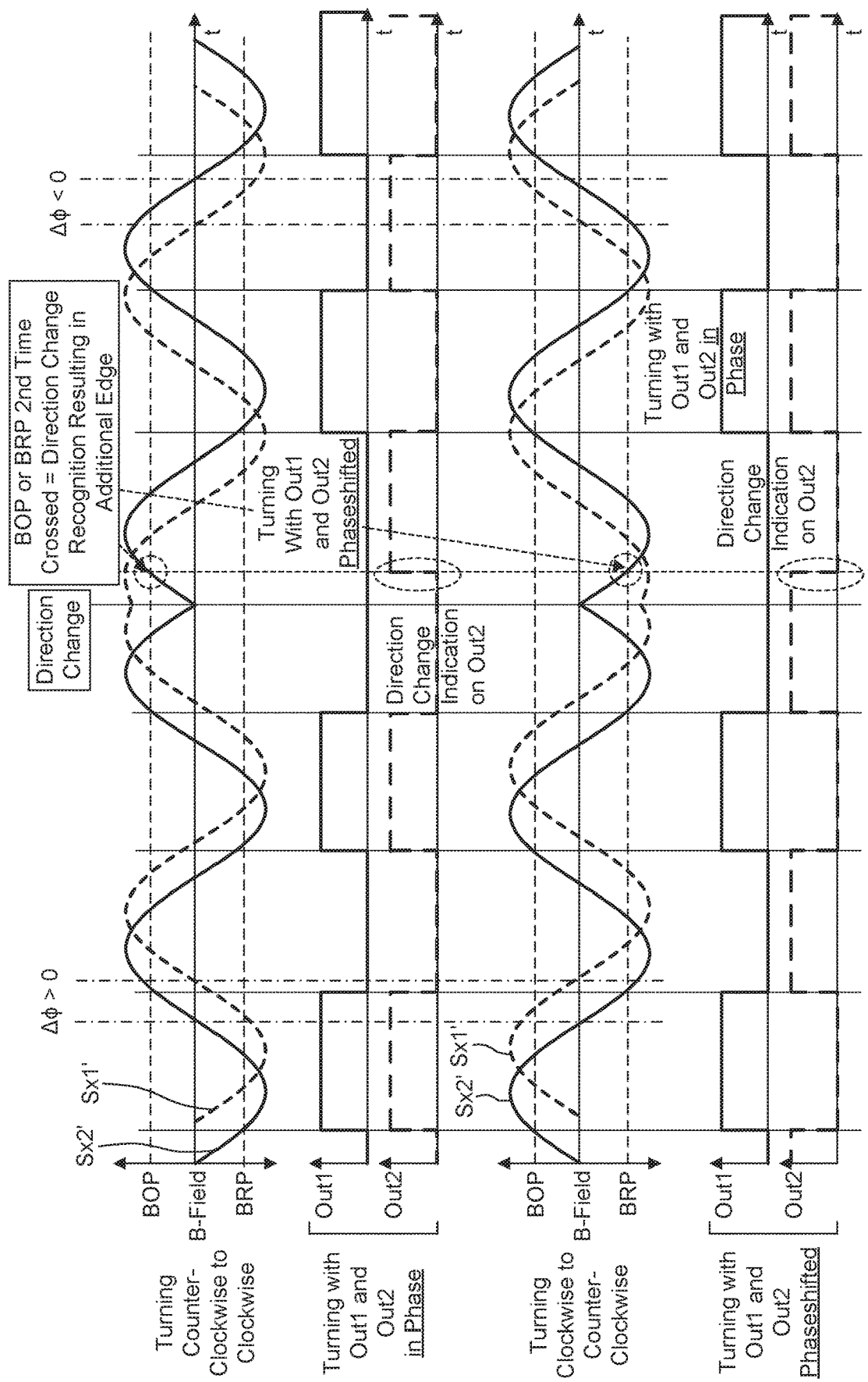
FIG. 6B is another diagram of sensor measurement signals and corresponding output signals according to the embodiment of FIG. 5B.
Figure 6C:
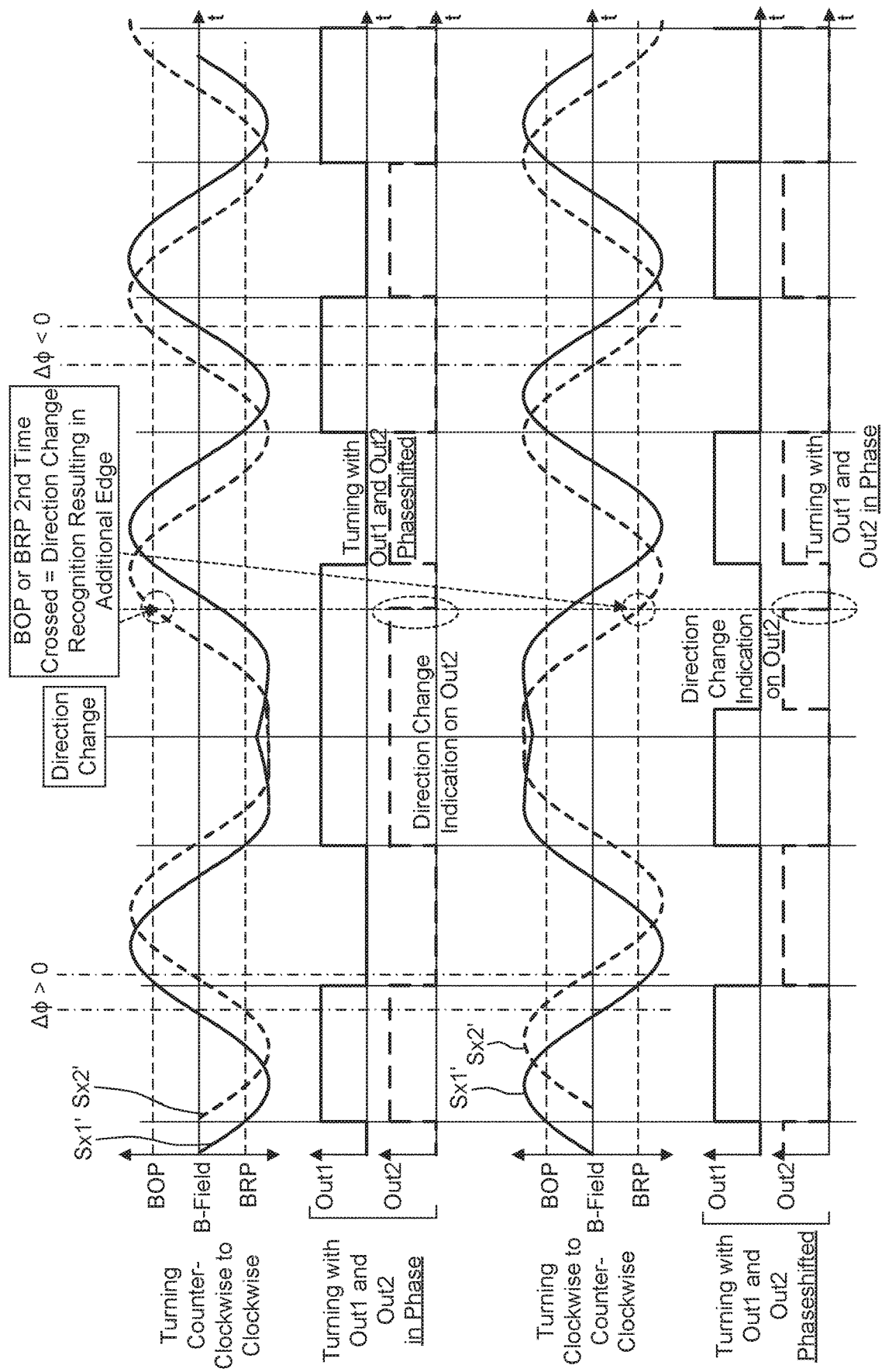
FIG. 6C is another diagram of sensor measurement signals and corresponding output signals according to the embodiment of FIG. 5B.
Figure 6D:
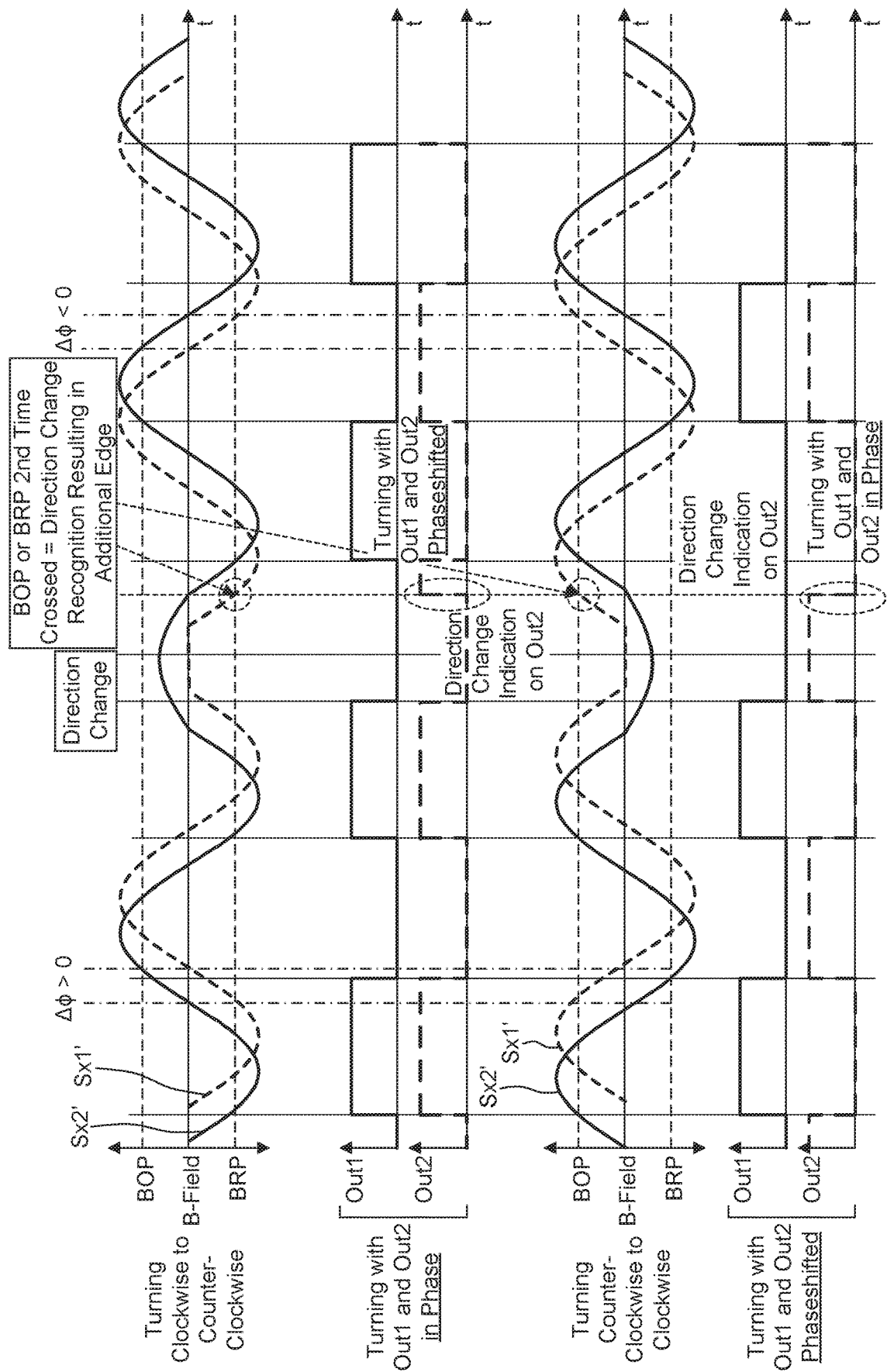
FIG. 6D is another diagram of sensor measurement signals and corresponding output signals according to the embodiment of FIG. 5B.

FIGS. 6B-6D show additional diagrams of sensor measurement signals and corresponding output signals according to one or more further embodiments. Like FIG. 6A, any two phase-shifted measurement signals capable of indicating a directional change may be used for generating the corresponding output signals OUT1 and OUT2. In these examples, measurement signals Sx1' and Sx2' are used by the speed and direction processing unit 16 to detect directional changes based on detecting a phase-shift inversion between the two measurement signals.

In particular, FIG. 6B illustrates examples of direction changes with one measurement signal above BOP or below BRP and the other measurement signal in hysteresis. In particular, during a direction change, measurement signal Sx1' remains above BOP or below BRP for an extended interval that allows for measurement signal Sx2' to have two consecutive crossings at the same switching threshold (i.e., at either the BOP or the BRP) without an intervening crossing at the same switching threshold made by measurement signal Sx1'. Accordingly, the phase-shift between the two measurement signals Sx1' and Sx2' changes via an inversion from a positive phase shift ($\Delta\varphi>0$) to a negative phase shift ($\Delta\varphi<0$).

The speed and direction processing unit 16 detects the phase-shift inversion by detecting the double crossing of measurement signal Sx2' described above. In response to the detected direction change, the speed and direction processing unit 16 changes the state of output signal OUT2. Because output signal OUT2 has an edge transition that is not synchronous with an edge transition of OUT1, the microcontroller 30 can detect the directional change based on analyzing the edge transitions of OUT2 with respect to the edge transitions of OUT1.

FIG. 6C illustrates examples of direction changes with both signals Sx1' and Sx2' above BOP or both signals below BRP. As a result of the direction change, measurement signal Sx2' has two consecutive crossings at the same switching threshold (i.e., at either the BOP or the BRP) without an intervening crossing at the same switching threshold made by measurement signal Sx1'. Accordingly, the speed and direction processing unit 16 detects the phase-shift inversion and changes the state of output signal OUT2.

FIG. 6D illustrates examples of direction changes with both signals Sx1' and Sx2' in hysteresis. As a result of the direction change, measurement signal Sx1' has two consecutive crossings at the same switching threshold (i.e., at either the BOP or the BRP) without an intervening crossing at the same switching threshold made by measurement signal Sx2'. Accordingly, the speed and direction processing unit 16 detects the phase-shift inversion and changes the state of output signal OUT2.

Figure 7:
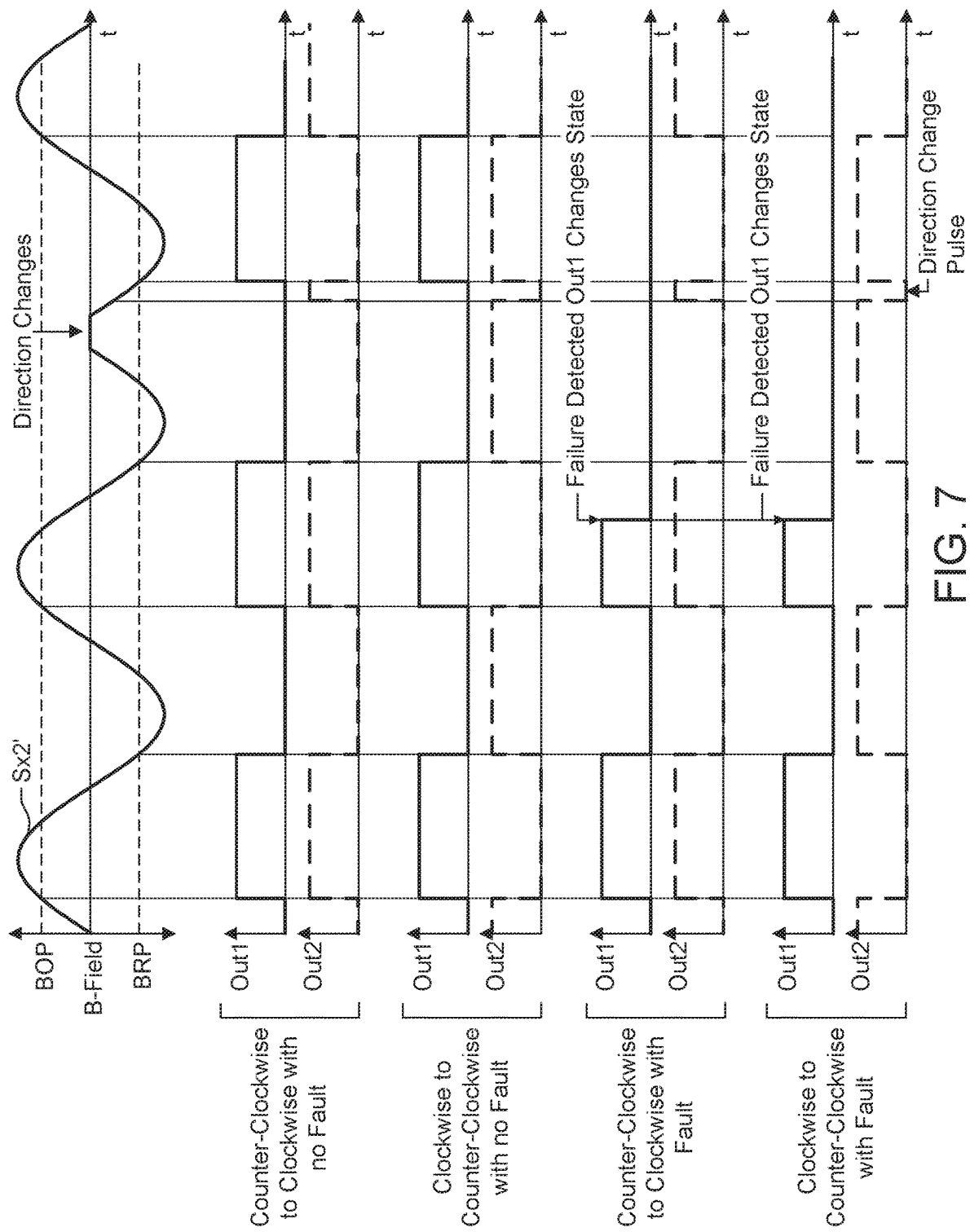
FIG. 7 is a diagram of a measurement signal and corresponding output signals in the occurrence of no fault and in the occurrence of a fault according to the embodiment of FIG. 5B.

FIG. 7 is a diagram of a measurement signal and corresponding output signals in the occurrence of no fault and in the occurrence of a fault according to one or more embodiments. The top diagram of FIG. 7 is a signal diagram of a measurement signal Sx2' that is representative of an oscillating magnetic field. The other signal diagrams illustrate corresponding output signals under different conditions, including: a change in direction from counter-clockwise to clockwise with no fault, a change in direction from clockwise to counter-clockwise to with no fault, a change in direction from counter-clockwise to clockwise with a fault, and a change in direction from clockwise to counter-clockwise to with a fault.

The direction change is detected and signaled by output signal OUT2 as similarly described in conjunction with FIGS. 6A-6D with the exception that the direction change does not occur at an edge of output signals OUT1 and OUT2. In this case, the output generator 17 generates a short pulse prior to realigning the edges of the output signals OUT1 and OUT2 to signal the direction change to the microcontroller 30.

In these examples, output signal OUT1 is used to indicate the fault. When the fault is detected and signaled to the output generator 17, the output generator 17 changes the state of output signal OUT1 and places the signal in a steady state (i.e., a continuously stable signal). The speed signal S1 is no longer used for the output signal OUT1 and is ignored. In this example, output signal OUT1 is in a high state when the fault is detected. Consequently, output signal OUT1 is switched into a low steady state. The output generator 17 continues to provide output signal OUT2 based on the direction signal S2 and the direction change protocol.

Overall this approach may be used in other applications, including analog rotating signals (sinus) with direction and diagnosis, angle sensors, and three-dimensional (3D) sensors with three output pins, but uses the same approach.

Figure 8:
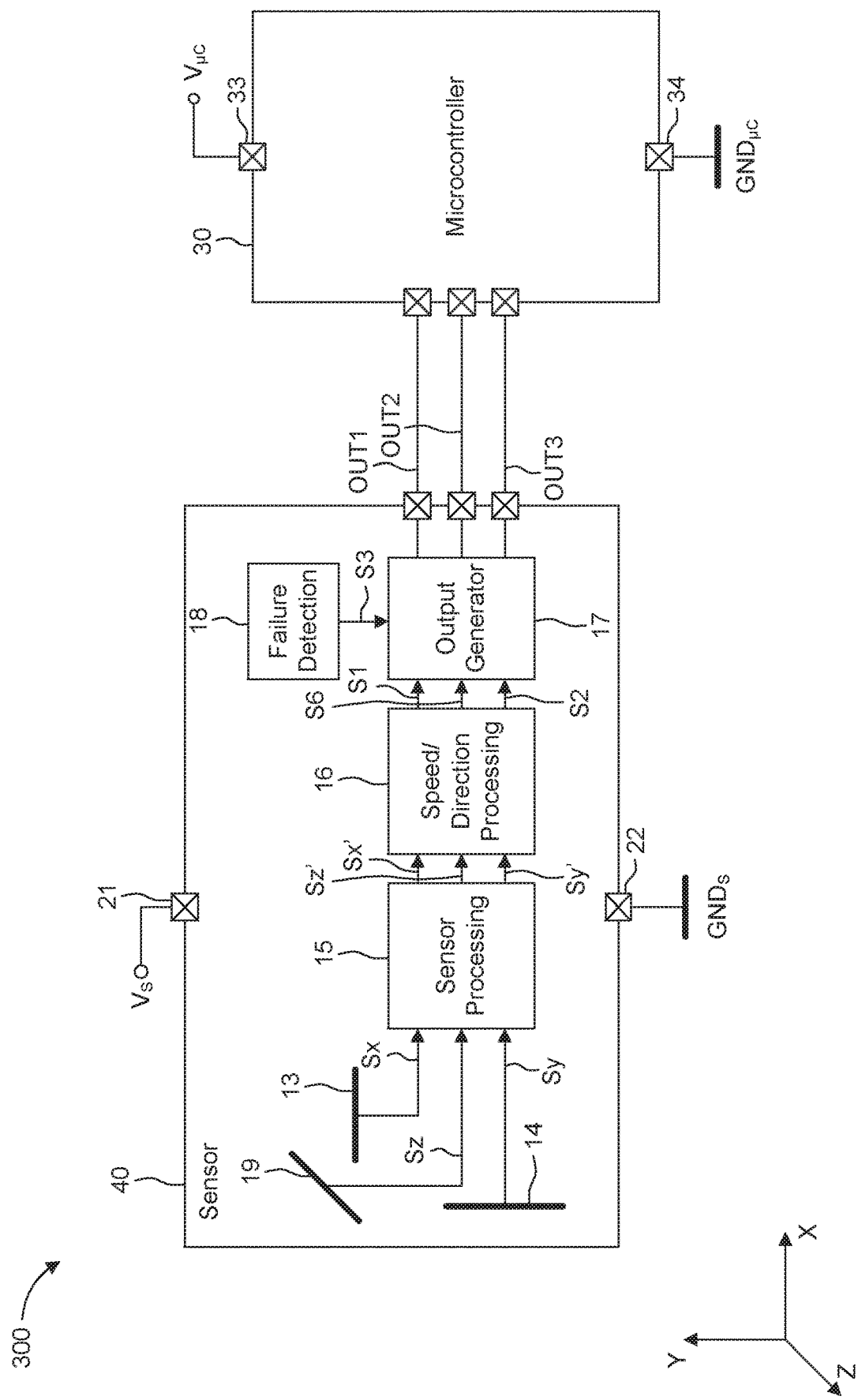
FIG. 8 is a schematic block diagram of a sensor system including a 3D magnetic sensor according to one or more embodiments

Namely, FIG. 8 is a schematic block diagram of a sensor system 300 including a 3D magnetic sensor according to one or more embodiments. A 3D magnetic sensor 40 is configured to measure three different orthogonal magnetic field components of a magnetic field and generate sensor signals in response to the three measured magnetic field components. Three sensor elements, including sensor element 13, 14, and 19, are provided with three different sensing directions. Each sensor element 13, 14, and 19 generates sensor signals Sx, Sy, and Sz, respectively.

The sensor processing circuit 15 is configured to receive the analog sensor signals from the sensor elements 13, 14, and 19, and generate measurement signals Sx', Sy', and Sz' in accordance with the above description.

The speed and direction processing circuit 16 generates a corresponding pulsed output signal S1, S2, and S6 for each of the measurement signals Sx', Sy', and Sz', respectively, with synchronized edge transitions in accordance with the above description.

Thus, the output generator 17 receives three pulsed output signals S1, S2, and S6 and forwards them along to the microcontroller 30 as output signals OUT1, OUT2, and OUT3, respectively, if no error is detected. However, three different types of faults, each mapped to one of the output signals OUT1, OUT2, and OUT3, may be detected by the fault detector 18 and signaled to the output generator 17. In response to receiving the error signal S3, the output generator 17 is configured to set one of the output signals mapped to the detected fault into a steady state. The microcontroller 30 is configured to detect one of the output signals as being in the steady state, thereby detecting the fault, and further determine the type of fault based on the mapping between output signals and fault types.

Thus, the number of N output pins is equal to a number of N magnetic field components or dimensions the magnetic sensor is configured to detect. When operating under a normal condition (i.e., with no detected fault), each output pin outputs respective sensor data. When a fault condition occurs, one output pin is used to indicate the fault while the remaining output pins continue to provide their respective sensor data.

It will be appreciated that direction change protocol described in conjunction with FIGS. 5B, 6, and 7 may also be used in combination with any of the above-described embodiments.

Figure 9:
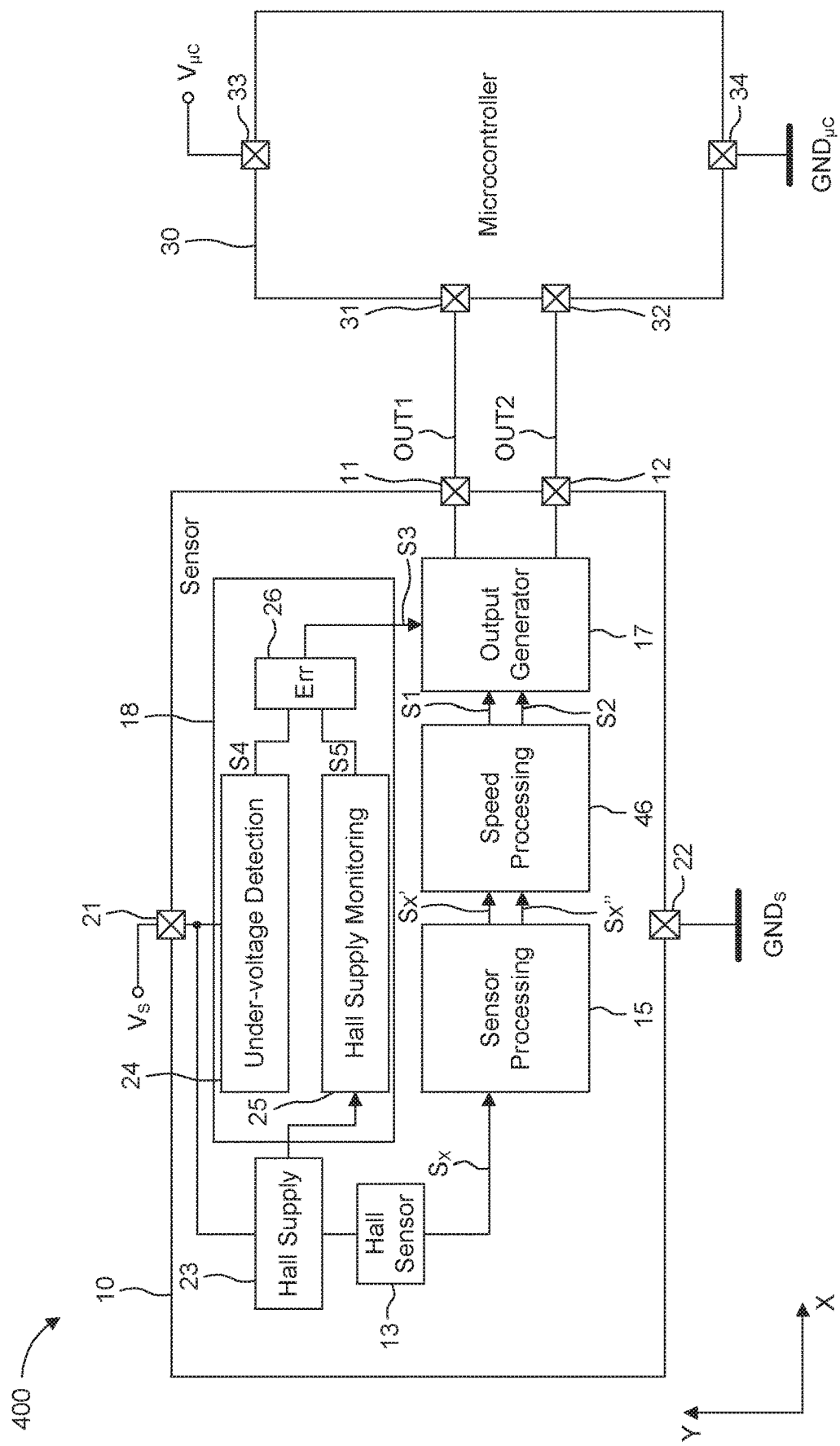
FIG. 9 is a schematic block diagram of a sensor system including a magnetic sensor according to one or more embodiments.

FIG. 9 is a schematic block diagram of a sensor system 400 including a magnetic sensor according to one or more embodiments. The sensor system 400 is similar to the sensor system 200B in FIG. 5B, with the exception that sensor system 400 utilizes one sensor element for a speed sensing application. Features being the same or similar to those in sensor system 200B will not be described again.

In this example, sensor element 13 is a Hall sensor element. The sensor element 13 senses a sinus of the magnetic field. The sensor processing circuit 15 is configured to receive the analog sensor signal(s) from sensor element 13, and perform signal processing and/or conditioning thereon to thereby generate measurement signal Sx' in accordance with the above description. In addition, the sensor processing circuit 15 generates an additional measurement signal Sx" as a duplicate to measurement signal Sx'. Thus, measurement signals Sx' and Sx" are speed signals that represent a movement speed (e.g., rotational speed or linear speed) of a target object.

The measurement signals Sx' and Sx" are output from the sensor processing circuit 15 and provided to a speed processing circuit 46. The speed processing circuit 46 performs similar functions described with respect to the speed and direction processing circuit 16, except the speed processing circuit 46 does not perform any direction processing or analysis. Thus, speed processing circuit 46 generates a corresponding pulsed output signal S1 and S2 for each of the measurement signals Sx' and Sx", respectively, with synchronized edge transitions in accordance with the above description. Since measurement signals Sx' and Sx" are identical, pulsed output signal S1 and S2 are also identical.

To generate pulsed output signal S1, the speed processing circuit 16 analyses the measurement signal Sx' and generates a pulsed output signal S1. In particular, the speed processing circuit 46 may include a current modulator, also referred to as a protocol generator, that receives the measurement signal Sx' and generates the output signal S1 as an output current according to a programmed current switching protocol or rule set build out of, for example, comparators. The output current may be between two current values in order to generate current pulses. The frequency of the current pulses are directly related to the speed of the target object. A similar analysis, using the same programmed current switching protocol or rule set, is performed on measurement signal Sx" to generate pulsed output signal S2.

It is also conceivable that the sensor processing circuit 15 only generates a single measurement signal Sx' for the speed processing circuit 46. In this case, the speed processing circuit 46 may generate the pulsed output signal S1 and then duplicate the pulsed output signal S1 to generate pulsed output signal S2. In either case, both pulsed output signals S1 and S2 are identical, with synchronized pulse transition edges. The frequency of the pulses indicate the speed of the magnetic sinus signal.

The magnetic sensor 10 further includes an output generator 17 and a fault detector 18. The output generator 17 is configured to monitor for an error signal S3 generated by the fault detector 18 in response to a detected fault in the magnetic sensor 10.

On a first condition that no error signal S3 is received, the output generator 17 may receive the pulsed output signals S1 and S2 and pass the signals along to their respective output pins 11 and 12 with some or no additional signal processing or conditioning. As a result, the first output signal OUT1 is representative of the pulsed output signal S1 and the second output signal OUT2 is representative of the pulsed output signal S2. As noted above, the pulsed output signal S1 and the pulsed output signal S2 have edge transitions that occur at the same time. Similarly, the output signals OUT1 and OUT2 are pulsed output signals having pulses that are synchronized with each other under the first condition. Thus, when the error signal S3 is not present, they both transition between two states at the same time.

However, on a second condition that an error signal S3 is received by the output generator 17, the output generator 17 may modify one of the pulsed output signals S1 or S2 to indicate not only that a fault has occurred but also to indicate the type of fault that has occurred. For example, the fault detector 18 may monitor for two or more different types of faults or classes of faults and the fault detector 18 is configured to generate the error signal S3 that includes fault information. The fault information indicates the type of fault that has occurred or a combination of faults that has occurred.

In some embodiments, the fault detector 18 may be used to monitor for two specific faults and generate the error signal S3 upon detection of one of those specific faults. Alternatively, the fault detector 18 may be used to monitor for the occurrence of a two specific combinations of possible faults, and generate the error signal S3 upon detection of one of those combinations of faults. For example, the fault detector 18 may monitor for a first type of fault or a first combination of faults and may monitor for s second type of fault or a second combination of faults. Thus, any type of fault detection based on two or more faults is possible.

For example, the fault detector 18 includes an error signal generator 26 that monitors for two different types of faults via the fault signals S4 and S5, and upon receiving one of the fault signals, generates the error signal S3 that includes fault information that identifies the type of fault detected (i.e., based on whether fault signal S4 or S5 is received). It will be appreciated that other types of faults or classes of faults may be monitored by the error signal generator 26. The error signal generator 26 is configured to detect a specific type of fault or combination of faults and trigger the error signal S3 in response to a detection thereof.

In response to receiving the error signal S3, the output generator 17 determines the type of fault based on the fault information and determines which output signal to modify based on the determined fault. For example, based on the occurrence of a first fault type, the output generator 17 may decide to modify the pulsed output signal S1 such that the output signal OUT1 remains in a steady state (i.e., a continuously stable signal that no longer switches between output states).

Similarly, based on the occurrence of a second fault type, the output generator 17 may decide to modify the pulsed output signal S2 such that the output signal OUT2 remains in a steady state The microcontroller 30 is configured to receive the two output signals OUT1 and OUT2 at two corresponding input pins 21 and 22 and monitor for a fault based on analyzing and interpreting the two output signals OUT1 and OUT2. In particular, when a fault in the magnetic sensor 10 occurs, one of the two output signals OUT1 or OUT2 will be purposefully manipulated by the output generator 17 based on the error signal S3. The microcontroller 30 is configured to perform edge detection on both output signals OUT1 and OUT2, and perform an edge analysis at each detected edge of each output signal OUT1 and OUT2. If the microcontroller 30 detects that an edge transition occurs in one signal without a simultaneous edge transition occurring in the other signal, the microcontroller 30 determines that a fault has occurred.

The microcontroller 30 may determine the type of fault that has occurred based on a further analysis of determining which output signal is in a steady state. The output signal that is in a steady state is indicative of the type of fault based on mapping information stored at the microcontroller 30. Thus, if the microcontroller 30 determines that output signal OUT1 is in a steady state, the microcontroller 30 determines that first fault type or a first combination of faults has occurred. On the other hand, if the microcontroller 30 determines that output signal OUT2 is in a steady state, the microcontroller 30 determines that second fault type or a second combination of faults has occurred. Meanwhile, one of the output signal remains operational as a speed signal. Thus, the microcontroller 30 can still use that other, pulsed output signal (i.e., OUT1 or OUT2) for speed information in speed applications. Appropriate troubleshooting or precautionary measures can be initiated by the microcontroller 30 based on the determined fault type or combination of faults.

Thus, at least two types of faults can be communicated to the microcontroller 30 by the magnetic sensor 10 by using the two output signals OUT1 and OUT2 and the fault can be detected and its type identified by the microcontroller 30.

Figure 10A:
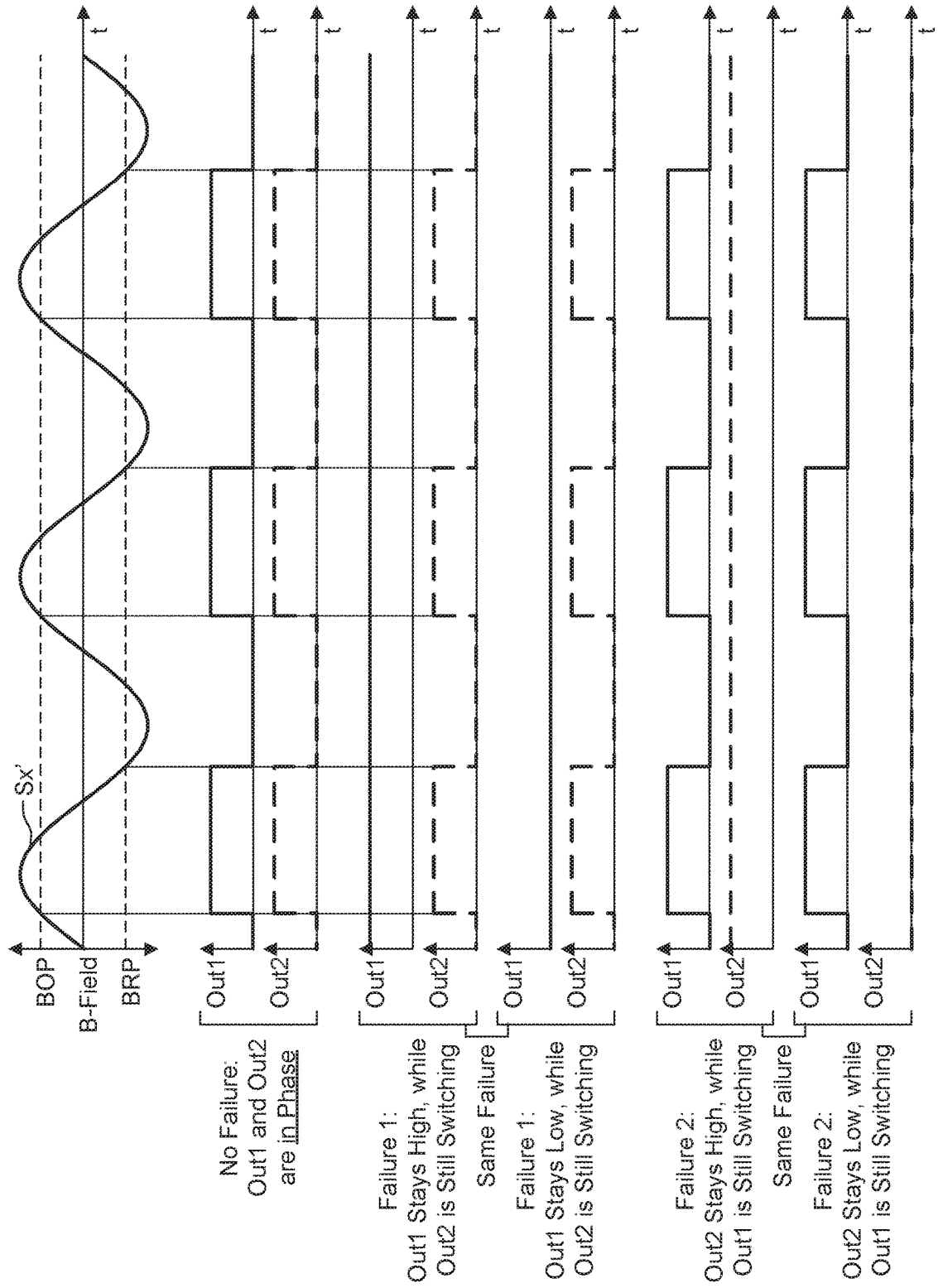
FIG. 10A is a diagram of a measurement signal and corresponding output signals in the occurrence of no fault and in the occurrence of at least one fault according to the embodiment of FIG. 9.

FIG. 10A is a diagram of a measurement signal and corresponding output signals in the occurrence of no fault and in the occurrence of two faults according to the embodiment of FIG. 9. FIG. 10B is a diagram of a measurement signal and corresponding output signals in the occurrence of no fault and in the occurrence of four faults according to the embodiment of FIG. 9. The top diagram of FIGS. 10A and 10B is a signal diagram of a measurement signal Sx' that is representative of an oscillating magnetic field (i.e., the magnetic sinus signal).

In FIG. 10A, the other signal diagrams illustrate corresponding output signals under different conditions, including: synchronized output signals OUT1 and OUT2 under a normal, no fault condition, signaling a first fault type via output signal OUT1 when output signal OUT1 is in a high state, signaling a first fault type via output signal OUT1 when output signal OUT1 is in a low state, signaling a second fault type via output signal OUT2 when output signal OUT2 is in a high state, and signaling a second fault type via output signal OUT2 when output signal OUT2 is in a low state. An output signal remains in the state it was in at the time its corresponding fault type was detected by the error signal generator 26 and signaled by the error signal S3. Thus, if it was in a high state, it remains high; if it was in a low state, it remains low. The fault can be detected and its type identified by the microcontroller 30.

In FIG. 10B, the other signal diagrams illustrate corresponding output signals under different conditions, including: synchronized output signals OUT1 and OUT2 under a normal, no fault condition, signaling a first fault type via output signal OUT1 when output signal OUT1 is in a high state, signaling a second fault type via output signal OUT1 when output signal OUT1 is in a low state, signaling a third fault type via output signal OUT2 when output signal OUT2 is in a high state, and signaling a fourth fault type via output signal OUT2 when output signal OUT2 is in a low state. An output signal is switched to and maintained in a low state or a high state, out of synchronization with the edge transitions of the other output signal, in response to one of its corresponding fault types being detected by the error signal generator 26 and signaled by the error signal S3. The fault can be detected and its type identified by the microcontroller 30.

While various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A sensor device, comprising:
   at least one first sensor element having a first sensing direction and configured to generate at least one first sensor signal based on sensing a first magnetic field component of a varying magnetic field aligned in the first sensing direction;
   at least one second sensor element having a second sensing direction and configured to generate at least one second sensor signal based on sensing a second magnetic field component of the varying magnetic field aligned in the second sensing direction;
   a signal processing circuit configured to generate a first pulsed signal based on the at least one first sensor signal and generate a second pulsed signal based on the at least one second sensor signal;
   a fault detector configured to detect at least one fault and generate an error signal indicating the at least one fault in response to detecting the at least one fault; and
   an output generator configured to receive the first pulsed signal and the second pulsed signal, receive the error signal based on a first condition that the fault detector detects the at least one fault, and parallelly output a first output signal and a second output signal,
   wherein, based on a second condition that the fault detector does not detect the at least one fault, the output generator is configured to output the first pulsed signal as the first output signal and output the second pulsed signal as the second output signal,
   wherein, in response to the first condition being satisfied, the output generator is configured to maintain the first output signal in a steady state and output the second pulsed signal as the second output signal, and
   wherein the output generator is configured to output the first output signal from a first output pin and output the second output signal from a second output pin that is different from the first output pin.

2. The sensor device of claim 1, wherein:
   the first pulsed signal comprises a first plurality of transition edges defining a plurality of first pulses, the second pulsed signal comprises a second plurality of transition edges defining a plurality of second pulses, and
   the first plurality of transition edges are synchronized with the second plurality of transition edges.

3. The sensor device of claim 1, wherein, while the second condition is satisfied:
   the first output signal comprises a first plurality of transition edges defining a plurality of first pulses, the second output signal comprises a second plurality of transition edges defining a plurality of second pulses, and
   the first plurality of transition edges are synchronized with the second plurality of transition edges.

4. The sensor device of claim 3, wherein, while the second condition is satisfied, each of the first plurality of transition edges is synchronized with a corresponding transition edge of the second plurality of transition edges.

5. The sensor device of claim 1, wherein the signal processing circuit is configured to determine a phase-shift direction of a phase-shift between the at least one first sensor signal and the at least one second sensor signal, and generate the second pulsed signal based on the determined phase-shift direction.

6. The sensor device of claim 5, wherein:
   while the first condition or the second condition is satisfied, the second pulsed signal provides speed information indicating a speed at which the varying magnetic field varies and direction change information indicating a change in direction of the varying magnetic field.

7. The sensor device of claim 5, wherein:
   the first pulsed signal indicates a speed at which the varying magnetic field varies, and
   the second pulsed signal indicates a direction in which the varying magnetic field varies.

8. The sensor device of claim 7, wherein:
   the speed is a rotational speed, and
   the direction is a rotational direction.

9. The sensor device of claim 7, wherein the signal processing circuit is configured to determine whether the direction in which the varying magnetic field varies is in a first direction or a second direction, generate the first pulsed signal and the second pulsed signal to be in-phase with each other in response to determining that the direction is in the first direction, and generate the first pulsed signal and the second pulsed signal to be out-of-phase with each other in response to determining that the direction is in the second direction.

10. The sensor device of claim 1, wherein:
    while the first condition is satisfied, the second output signal provides speed information indicating a speed at which the varying magnetic field varies and direction change information indicating a change in direction of the varying magnetic field.

11. The sensor device of claim 1, wherein the sensor device is a semiconductor chip comprising the first output pin configured to output the first output signal from the semiconductor chip and the second output pin configured to output the second output signal from the semiconductor chip.

12. The sensor device of claim 1,
wherein the first sensing direction and the second sensing direction are either a same direction or different directions.

13. A sensor device, comprising:
at least one first sensor element configured to generate at least one first sensor signal based on sensing a varying magnetic field;
at least one second sensor element configured to generate at least one second sensor signal based on sensing the varying magnetic field, wherein the at least one first sensor signal is phase-shifted from the at least one second sensor signal;
a signal processing circuit configured to generate a first pulsed signal based on the at least one first sensor signal, determine a phase-shift direction of a phase-shift between the at least one first sensor signal and the at least one second sensor signal, and generate a second pulsed signal based on the determined phase-shift direction, wherein the signal processing circuit is further configured to detect a phase-shift inversion of the phase-shift, and switch a state of the second pulsed signal in response to detecting the phase-shift inversion;
a fault detector configured to detect at least one fault and generate an error signal indicating the at least one fault in response to detecting the at least one fault; and
an output generator configured to receive the first pulsed signal and the second pulsed signal, receive the error signal based on a first condition that the fault detector detects the at least one fault, and parallelly output a first output signal and a second output signal,
wherein, based on a second condition that the fault detector does not detect the at least one fault, the output generator is configured to output the first pulsed signal as the first output signal and output the second pulsed signal as the second output signal,
wherein, in response to the first condition being satisfied, the output generator is configured to maintain the first output signal in a steady state and output the second pulsed signal as the second output signal, and
wherein the output generator is configured to output the first output signal from a first output pin and output the second output signal from a second output pin that is different from the first output pin.

14. The sensor device of claim 13, wherein the signal processing circuit is configured to determine whether a direction in which the varying magnetic field varies is in a first direction or a second direction, generate the first pulsed signal and the second pulsed signal to be in-phase with each other in response to determining that the direction is in the first direction, and generate the first pulsed signal and the second pulsed signal to be out-of-phase with each other in response to determining that the direction is in the second direction.

15. The sensor device of claim 13, wherein:
the at least one first sensor element is configured to generate the at least one first sensor signal based on sensing a first magnetic field component of the varying magnetic field, and
the at least one second sensor element is configured to generate the at least one second sensor signal based on sensing a second magnetic field component of the varying magnetic field, wherein the first magnetic field component and the second magnetic field component are projected in different directions.

16. The sensor device of claim 13, wherein:
the at least one first sensor element is configured to generate the at least one first sensor signal based on sensing a first magnetic field component of the varying magnetic field, and
the at least one second sensor element is configured to generate the at least one second sensor signal based on sensing the first magnetic field component of the varying magnetic field along a same sensing axis at the at least one first sensor element.

17. The sensor device of claim 13, wherein:
while the second condition is satisfied, the first output signal indicates a speed at which a varying magnetic field varies and the second output signal indicates a direction in which the varying magnetic field varies, including indicating a direction change that indicates a change in direction of the varying magnetic field, and
while the first condition is satisfied, the first output signal indicates the first condition, and the second output signal indicates the speed at which the varying magnetic field varies and indicates the direction change of the varying magnetic field.

18. A sensor device, comprising:
at least one first sensor element configured to generate at least one first sensor signal based on sensing a magnetic field component of a varying magnetic field;
a signal processing circuit configured to generate a first pulsed signal based on the at least one first sensor signal and generate a second pulsed signal in duplicate to the first pulsed signal;
a fault detector configured to detect at least one first fault and generate a first error signal indicating the at least one first fault in response to detecting the at least one first fault; and
an output generator configured to receive the first pulsed signal and the second pulsed signal, receive the first error signal based on a first condition that the fault detector detects the at least one first fault, and parallelly output a first output signal and a second output signal,
wherein, based on a second condition that the fault detector does not detect the at least one first fault, the output generator is configured to output the first pulsed signal as the first output signal,
wherein, in response to the first condition being satisfied, the output generator is configured to maintain the first output signal in a steady state and output the second pulsed signal as the second output signal, and
wherein the output generator is configured to output the first output signal from a first output pin and output the second output signal from a second output pin that is different from the first output pin.

19. The sensor device of claim 18, wherein:
the fault detector is configured to detect at least one second fault and generate a second error signal indicating the at least one second fault in response to detecting the at least one second fault, the output generator is configured to receive the second error signal based on a third condition that the fault detector detects the at least one second fault, while a fourth condition that the fault detector does not detect the first fault or the second fault is satisfied, the output generator is configured to output the first pulsed signal as the first output signal and output the second pulsed signal as the second output signal, and
in response to the third condition being satisfied, the output generator is configured to maintain the second output signal in a steady state and output the first pulsed signal as the first output signal.

20. The sensor device of claim 19, wherein the at least one first fault and the at least one second fault are different fault types.

21. The sensor device of claim 19, wherein the output generator stores a mapping that maps the at least one first fault to the first output signal and maps the at least one second fault to the second output signal.

22. The sensor device of claim 19, wherein:
in response to the first condition being satisfied, the output generator is configured to disregard the first pulsed signal, and
in response to the third condition being satisfied, the output generator is configured to disregard the second pulsed signal.

23. The sensor device of claim 19, wherein:
while the fourth condition is satisfied, the first output signal comprises a first plurality of transition edges defining a plurality of first pulses, the second output signal comprises a second plurality of transition edges defining a plurality of second pulses, and the first plurality of transition edges are synchronized with the second plurality of transition edges.

24. The sensor device of claim 18, wherein:
the first pulsed signal comprises a first plurality of transition edges defining a plurality of first pulses,
the second pulsed signal comprises a second plurality of transition edges defining a plurality of second pulses, and
the first plurality of transition edges are synchronized with the second plurality of transition edges.

25. The sensor device of claim 18, wherein:
the first pulsed signal and the second pulse signal indicate a speed at which the varying magnetic field varies.

26. A sensor device, comprising:
at least one first sensor element configured to generate at least one first sensor signal based on sensing a magnetic field component of a varying magnetic field;
a signal processing circuit configured to generate a first pulsed signal based on the at least one first sensor signal and generate a second pulsed signal in duplicate to the first pulsed signal;
a fault detector configured to detect at least one first fault and generate a first error signal indicating the at least one first fault in response to detecting the at least one first fault, detect at least one second fault and generate a second error signal indicating the at least one second fault in response to detecting the at least one second fault, detect at least one third fault and generate a third error signal indicating the at least one third fault in response to detecting the at least one third fault, and detect at least one fourth fault and generate a fourth error signal indicating the at least one fourth fault in response to detecting the at least one fourth fault; and
an output generator configured to receive the first pulsed signal and the second pulsed signal, receive the first error signal based on a first condition that the fault detector detects the at least one first fault, receive the second error signal based on a second condition that the fault detector detects the at least one second fault, receive the third error signal based on a third condition that the fault detector detects the at least one third fault, receive the fourth error signal based on a fourth condition that the fault detector detects the at least one fourth fault, and parallelly output a first output signal and a second output signal, wherein, based on a fifth condition that the fault detector does not detect the at least one first fault, the at least one second fault, the at least one third fault, or the at least one fourth fault, the output generator is configured to output the first pulsed signal as the first output signal and output the second pulsed signal as the second output signal, and
wherein, in response to the first condition being satisfied, the output generator is configured to maintain the first output signal in a high steady state and output the second pulsed signal as the second output signal, wherein, in response to the second condition being satisfied, the output generator is configured to maintain the first output signal in a low steady state and output the second pulsed signal as the second output signal, wherein, in response to the third condition being satisfied, the output generator is configured to maintain the second output signal in the high steady state and output the first pulsed signal as the first output signal, wherein, in response to the fourth condition being satisfied, the output generator is configured to maintain the second output signal in the low steady state and output the first pulsed signal as the first output signal, and
wherein the output generator is configured to output the first output signal from a first output pin and output the second output signal from a second output pin that is different from the first output pin.

27. The sensor device of claim 1, wherein the output generator is configured to output the first output signal and the second output signal as separate signals.

28. The sensor device of claim 1, wherein the first output signal and the second output signal are output via separate signal paths.

29. The sensor device of claim 1, wherein the first output signal and the second output signal are digital signals.

* * * * *